US012038164B2

(12) United States Patent
Curlett et al.

(10) Patent No.: US 12,038,164 B2
(45) Date of Patent: Jul. 16, 2024

(54) LIGHTWEIGHT LED LIGHTING SYSTEMS FOR PERMANENT AND SEMI-PERMANENT MOUNTING ON ELEVATED STRUCTURES HAVING INTEGRATED SUPPORT AND THERMAL TRANSFER FEATURES

(71) Applicant: CLEANTEK INDUSTRIES INC., Calgary (CA)

(72) Inventors: Joshua Curlett, Calgary (CA); Hugues Wanlin, Canmore (CA)

(73) Assignee: CLEANTEK INDUSTRIES INC., Calgary (CA)

( * ) Notice: Subject to any disclaimer, the term of this patent is extended or adjusted under 35 U.S.C. 154(b) by 0 days.

(21) Appl. No.: 17/871,186

(22) Filed: Jul. 22, 2022

(65) Prior Publication Data

US 2022/0357028 A1 Nov. 10, 2022

Related U.S. Application Data

(63) Continuation of application No. 17/045,345, filed as application No. PCT/CA2019/050410 on Apr. 4, 2019, now Pat. No. 11,408,603.

(Continued)

(51) Int. Cl.
*F21V 29/61* (2015.01)
*E21B 15/00* (2006.01)

(Continued)

(52) U.S. Cl.
CPC .............. *F21V 29/61* (2015.01); *E21B 15/00* (2013.01); *F21S 8/043* (2013.01); *F21V 21/30* (2013.01);

(Continued)

(58) Field of Classification Search
CPC ...... F21V 7/0083; F21V 29/673; F21V 29/61; F21V 29/67; F21V 29/89; F21V 29/76;

(Continued)

(56) References Cited

U.S. PATENT DOCUMENTS 4,862,336 A 8/1989 Richardson et al.
6,247,830 B1 * 6/2001 Winnett .................. H01J 61/52 362/264

(Continued)

FOREIGN PATENT DOCUMENTS

CN 101943354 1/2011
CN 206338693 7/2017

(Continued)

OTHER PUBLICATIONS

English Machine Translation of WO 2019012703 provided by ESPACENET (Year: 2019).*

(Continued)

*Primary Examiner* — Zheng Song
(74) *Attorney, Agent, or Firm* — Greenblum & Bernstein, P.L.C.

(57) ABSTRACT

The invention relates to lightweight LED lighting systems for permanent and semi-permanent mounting on elevated structures, the lighting systems having integrated support and thermal transfer features. The systems are particularly suited for elevated mast systems and specifically for mast systems that are repeatedly lifted and lowered such as drilling and service rig masts. Specifically, the invention improves a) the weight/lumen ratios of LED lamp assemblies and LED lighting systems, b) the net added weight of LED lighting systems, c) the footprint of LED light systems and/or d) obviates the need for removing LED lighting systems or their sub-assemblies when transporting mast systems.

18 Claims, 32 Drawing Sheets

Related U.S. Application Data

(60) Provisional application No. 62/673,440, filed on May 18, 2018, provisional application No. 62/669,852, filed on May 10, 2018, provisional application No. 62/652,747, filed on Apr. 4, 2018.

(51) Int. Cl.

| | |
|---|---|
| ***F21S 8/04*** | (2006.01) |
| ***F21V 21/30*** | (2006.01) |
| ***F21V 29/67*** | (2015.01) |
| ***F21V 29/89*** | (2015.01) |
| *F21W 131/10* | (2006.01) |
| *F21Y 105/10* | (2016.01) |
| *F21Y 115/10* | (2016.01) |

(52) U.S. Cl.
CPC .............. *F21V 29/67* (2015.01); *F21V 29/89* (2015.01); *F21W 2131/1005* (2013.01); *F21Y 2105/10* (2016.08); *F21Y 2115/10* (2016.08)

(58) Field of Classification Search
CPC ........ F21V 21/30; F21V 23/003; F21S 8/043; E21B 15/00
See application file for complete search history.

(56) References Cited

U.S. PATENT DOCUMENTS

| | | | | |
|---|---|---|---|---|
| 7,278,761 | B2 * | 10/2007 | Kuan | F21S 8/086 362/373 |
| 7,798,684 | B2 | 9/2010 | Boissevain | |
| 8,651,704 | B1 * | 2/2014 | Gordin | F21V 29/60 362/373 |
| 8,704,262 | B2 | 4/2014 | Livesay et al. | |
| 9,557,045 | B2 * | 1/2017 | Sato | H04N 9/3144 |
| 2009/0244901 | A1 * | 10/2009 | Hu | F21S 8/086 362/294 |
| 2009/0262525 | A1 * | 10/2009 | Lai | F21S 9/026 320/101 |
| 2009/0323361 | A1 * | 12/2009 | Liu | F21V 29/673 362/373 |
| 2010/0103671 | A1 | 4/2010 | Zheng | |
| 2014/0049957 | A1 * | 2/2014 | Goelz | F21V 29/763 362/294 |
| 2015/0138780 | A1 | 5/2015 | Yoshizawa et al. | |
| 2015/0153036 | A1 | 6/2015 | Gowanlock et al. | |
| 2015/0184840 | A1 | 7/2015 | Gowanlock et al. | |
| 2018/0187873 | A1 | 7/2018 | Carroll | |
| 2018/0372364 | A1 * | 12/2018 | Elwell | F21V 33/0092 |
| 2021/0116788 | A1 * | 4/2021 | Itsuji | H04N 23/56 |

FOREIGN PATENT DOCUMENTS

| | | | | |
|---|---|---|---|---|
| CN | 206890253 | | 1/2018 | |
| WO | WO 2019/012703 | * | 1/2019 | F21V 23/00 |

OTHER PUBLICATIONS

English Machine Translation of CN 206338693 provided by ESPACENET (Year: 2017).

* cited by examiner

LIGHTWEIGHT LED LIGHTING SYSTEMS FOR PERMANENT AND SEMI-PERMANENT MOUNTING ON ELEVATED STRUCTURES HAVING INTEGRATED SUPPORT AND THERMAL TRANSFER FEATURES

This is a Continuation of U.S. application Ser. No. 17/045,345, which is the U.S. National Stage of PCT/CA2019/050410, filed Apr. 4, 2019, which claims the benefit under 35 U.S.C. § 119(e) of U.S. Provisional Application Nos. 62/673,440, filed May 18, 2018, 62/669,852, filed May 10, 2018, and 62/652,747, filed Apr. 4, 2018. The disclosure of each of these applications is herein incorporated by reference in its entirety.

FIELD OF THE INVENTION

The invention relates to lightweight LED lighting systems for permanent and semi-permanent mounting on elevated structures, the lighting systems having integrated support and thermal transfer features. The systems are particularly suited for elevated mast systems and specifically for mast systems that are repeatedly lifted and lowered such as drilling and service rig masts. Specifically, the invention improves a) the weight/lumen ratios of LED lamp assemblies and LED lighting systems, b) the net added weight of LED lighting systems, c) the footprint of LED light systems and/or d) obviates the need for removing LED lighting systems or their sub-assemblies when transporting mast systems.

BACKGROUND OF THE INVENTION

LED lighting systems are well known and have a large number of applications. They are advantaged over past incandescent, fluorescent and metal halide systems in many applications for their energy consumption, robustness and durability.

In industrial applications, LED lighting systems continue to be used extensively and are becoming more common place for both portable and permanent applications and their associated markets. In the portable market, and in particular, the construction and energy industries, there are certain areas where LED lighting systems are not widespread due to various technical problems and/or limitations in certain applications. Although LED technology can supply lighting needs at a fraction of the energy consumption of metal halide technology, a drawback is the amount of metal required to dissipate and draw heat away from high-power LED lamps. As such, in many cases the cost and weight of LED lighting systems can make them a challenging option for retrofit structures that were originally built for metal halide lighting systems and/or mounting LED lighting systems to structures that were not designed to support the weight of LED lighting systems.

Specifically, the combined weight of an LEDs, lamp housings and heat sinks (collectively referred to herein as an LED lamp assembly) together with mounting brackets and all support frames required for configuring a plurality of LED lamp assemblies to an existing structure can limit or prevent a retrofit or a new build thus preventing lower energy LED technology to be deployed in some applications.

One example of a system that has had limited application of LED technology is oil industry drilling and service rigs and specifically mounting lighting on the crown or upper mast region of a drilling rig or service rig mast. As is known, drilling and service rigs and their masts are sophisticated and costly pieces of equipment designed for the complex task of drilling wells and servicing wells. Given the nature and location of drilling and service operations, drilling and service sites are operated around the clock and at all times of the year. As such, there is a need for effective lighting solutions on and around these rigs that meet the high demands and tough working environment of a rig including long term exposure to heat, cold and precipitation.

Importantly, while rigs are generally very well engineered structures, designed for their primary task of drilling or servicing wells, they must also be designed to be transported between well sites, and as such are often not designed to accommodate secondary tasks such as supporting lighting systems on their masts or crowns despite the desirability of having effective lighting at a central and high location of the site. As a result, lighting systems are often separate from the rig and mast and, as such, are operated as separate and independent pieces of equipment such as trailer mounted portable light tower systems. Separate and independent lighting sources can be effective in providing light to the site but they must be independently set up and directed to ensure that their light is effective at the site. This can increase the costs of lighting the rig as both additional equipment and personnel may be required. In addition, pieces of equipment such as fuel powered light towers are often not tall enough to provide a lighting source above the working surfaces of a rig.

As low watt per lumen LED technology has developed, new applications have arisen. Various prior art systems have configured high lumen lighting systems (for example, 0.5 million (MM) to 1.5 million (MM) systems) to the crown or upper section of a drilling rig or service rig mast and have shown that light can be provided to the entire drilling lease surface to provide a safer work area to the workers. For example, an LED lighting system mounted 165 feet (53 m) off the ground level where the workers need light, a 0.5 MM lumen LED system may not provide enough light on target; however, if that same 70.5 MM lumen system was added to an 80-foot (26 m) mast it would likely provide enough light on target. However, in the latter case, a smaller rig can generally support less weight than the taller bigger rigs and so, designers of LED lighting systems will consider both the height of the mast in determining the required light output as well as the ability of the mast to support a given weight. Importantly, and as discussed below, a key drawback of LED lamps assemblies and LED lighting systems that mount to a rig crown or upper mast is the overall weight or weight to lumen ratio requirements of such systems to provide a specific light output.

Primarily, the problem of weight at the crown or upper mast of a rig is that during the process of raising and lowering the mast at a job site (after moving the rig between drilling locations), the extra weight of an LED lighting system acting at the end of the mast can subject the mast to enough force that the mast will bend and/or break and/or put additional stresses on lifting equipment. In other words, because rigs are mobile systems, their overall weight and footprint are engineered such that both are usually minimized and are not "over engineered" to accommodate additional loads being placed on the rig. As noted previously, the smaller the rig the less weight it can support, but then due to a lower height of a smaller rig, fewer lumens are required to displace other means of site surface lighting.

For example, it is desirable to keep the overall weight of a rig low due to road weight restrictions and challenges of delivering heavy rigs down roads that are not paved, particularly when the roads are wet that can cause ruts and road damage. Accordingly, drilling rigs are designed with upper weights limits to enable their movement.

As such, current prior art lighting systems that provide for example 1 MM-1.5 MM lumens can weigh in the range of 2,000-2,500 lbs and, as a result, are limited from being installed on many drilling rigs due to the stresses that such systems impose on a drilling rig as it is being raised and lowered. While some rigs may be strong enough to allow this extra weight to be lifted, as noted above in some cases, it is the size and capabilities of the hydraulic ram lifting systems that limit the ability to use higher weight systems. While larger hydraulic lifting systems may be utilized, this can also represent a significant additional cost to an operator. For service rigs the same issues apply, but as this style of rig is generally smaller, they may only need 0.25 MM—0.75 MM lumens and may weigh 400-1,000 lbs. Thus, while the net added weight is lower for a service rig, as with the heavier drilling rigs, the weight to lumen ratio needs to be within a range to mitigate the above issues.

Another consideration is the time and equipment required to install a lighting system on a mast and the current requirement of having to remove the LED lighting system for transport due to the positioning the lighting systems and the extent to which they will project outwardly from the sides of the mast. Moreover, with the high weights of these systems, manpower and equipment is required. In other words, the installation and removal of LED lighting systems requires the use and cost of a crane and loader for rigging in and rigging out, plus the extra time it takes to remove and reattach the LED lighting system after each move. Since the rig companies often are compensated by their customer on time efficiency, this has created a barrier to market for many retrofit LED lighting systems and from gaining traction in the market. Accordingly, there is a need for LED lighting systems that can be permanently and/or semi-permanently configured to a rig such that during transport the LED lighting system can remain attached or substantially attached to the rig, thereby reducing time for transport between well sites and minimizing the need and cost associated with loaders, cranes and additional deck space on transport trucks.

Furthermore, to provide access to a higher percentage of existing drilling rigs, there is a need for lighting systems that reduce weight while providing sufficient light for rigs which typically have mast heights of 20-45 m for service type rigs and 30-50+m for drilling rigs. While weight can be reduced by decreasing the lumen output of the system, lower lumen systems may not provide sufficient light.

While newer systems have been developed that continue to reduce the weight of lighting systems greater than 1.0 MM lumens to around 550 kg, there remain many rigs where this amount of added weight is still too high.

For the purposes of discussion, if it is assumed that a low weight LED lighting system or a standard prior art LED lighting system for configuration to the crown of drilling rigs and that provides 1 MM+ lumens will generally weigh 1,200 lbs (500 kgs) to 2,400 lbs (1,100 kgs). These figures represent a ratio of 0.55 grams or 1.10 grams, respectively, of added weight/1.0 lumen (0.55:1.0 or 1.10:1.0 g/lumen respectively).

As the total mass of such systems cannot be used on many rigs, it is desirable to decrease the ratio of added weight/lumen below these numbers. In addition, it is desirable to decrease the total mass of lighting systems to reduce or obviate the time and equipment required to prepare a rig for installation or transport.

Specifically, for configuration to larger drilling rigs with mast heights in the range of 30-50+ meters wherein the overall lumens are preferably near or greater than 1 MM lumens, there is a need for the net added weight to be less than 1,100 lbs (500 kg), preferably less than 880 lbs (400 kg) and more preferably to around 600 lbs (275 kgs). Thus, for an LED lighting system of approximately 600 lbs (275 kg) and a 1 MM lumen LED lighting system, this is a ratio of 0.27 grams/lumen. For a high lumen output LED system for the same drilling rig providing 1.5 MM lumens a ratio of less than 0.2 and preferably less than 0.18 grams/lumen is desirable.

To achieve these levels of lighting with current LED lamps assemblies, a typical lighting system may include an array of 10-50 LED lamp assemblies, again depending on the applicable height of the LED lighting system while in use, each typically weighing in the range of 17.5-33 lbs (8-15 kg) based on typical designs as shown in FIGS. 1A and 1B. The weights of lamps described in the preceding sentence are for illustration and are not meant to be limiting.

Specifically, FIGS. 1A and 1B show the various components of a typical prior art LED lamp assembly 10 as including an LED housing 12, LED solid state light board 14 having LEDs (i.e. high power LEDs) 14*a*, reflectors 16, heat sink 18, housing cover 20, associated mounting brackets 22, optional cooling fans (not shown) and power cables 24. As noted above, due to the need for each LED lamp assembly to be robust and durable, a typical LED lamp assembly will have a separate housing, heat sink and brackets that are connected to one another during assembly. However, each of these components is generally heavy when assembled and when incorporated into an array of lamp assemblies can represent a significant weight. As noted, various prior art systems may also utilize a cooling fan to direct cooling air over one or more LEDs. As such, as the total weight of the LED lighting system includes the lamp assemblies as well as all the supporting frames, electrical cables, connectors, etc., the end result is that the desired ratios of grams/lumen as described above cannot be achieved with current designs.

As indicated, each LED lamp assembly 10 includes a heat sink 18 to ensure that heat generated by the LEDs is properly dissipated to ensure the LEDs are operated within the required temperature ranges and do not exceed recommended operating temperatures as set by a LED manufacturer. Moreover, it is generally desirable to manage power consumption for a given light output in lumens to ensure both efficiency and the longevity of the LEDs. Accordingly, an LED manufacturer will generally recommend that the temperature at the semi-conductor junction of each LED be maintained within a preferred temperature range to maintain power efficiency but also LED longevity. While a LED may be operated at a higher junction temperature (up to a maximum temperature before burning out), the power efficiency will drop off (i.e. higher watts being consumed per lumen of light intensity) and the longevity of the LED will drop. Hence, for practical purposes, high power LEDs are rarely operated at temperatures higher than the recommended temperatures.

Table 1 shows typical specifications of a high performance LED.

TABLE 1

Typical Specifications of a High Performance LED (Cree XHP 70, Cree Canada Corp, Mississauga, Ontario)

| Property | Parameter |
|---|---|
| Size | 7 by 7 mm |
| Voltage | 6 V or 12 V |
| Max Drive Current | 4.8 A (6 V)<br>2.4 A (12 V) |
| Max Power | 28.8 W |
| Max Light Output | 4022 lm |
| Max Efficiency at Binning Conditions | 150 lm/W |
| Typical Forward Voltage | 5.8 V White @ 2100 mA (6 V)<br>11.6 V White @ 1050 mA (12 V) |
| Maximum Reverse Voltage | −5 V |
| Viewing Angle | 120° |
| Maximum Junction Temperature | 150° C. |

As can be seen in this example, the maximum junction temperature is 150° C. However, in a typical operating scenario, it would be recommended to not operate the lamp at temperatures greater than about 80° C.

For an LED described in Table 1, an array of 16 LEDs within a housing 12 would have a maximum power requirement of about 460 W but would normally be operating at about 50-60% of maximum power thus consistently utilizing about 230-276 W of power. With the radiant efficiency of the LEDs typically being between 20% and 45%, this means that approximately 55-80% of the input power will be lost as heat. Assuming a 75% heat loss, this means 180-206 W of power is continuously being lost as heat which to prevent junction temperatures from rising must be efficiently removed.

In view of the foregoing and in summary, there has been a need for lightweight LED lighting systems that provide desired light on target (e.g. suitable, desired and usable light volume delivered to the area where workers require the light to complete tasks) and that can be effectively configured to tall structures at different and/or various heights from the surface of a work site (whether smaller service rigs or larger drilling rigs). In addition, there has been a need for LED lamp assemblies and LED lighting systems with lower ratios of grams/lumens than current LED lighting systems whilst enabling effective heat dissipation to maintain recommended junction temperatures.

Further still, there has been a need for LED lighting systems that integrate, partially-integrate and/or are otherwise configured with or to functional features of a rig's upper mast and/or crown with an LED lighting system such that the net added weight of adding lighting to a drilling mast is reduced. In addition, there has been a need for LED lighting systems that integrate or partially-integrate with, or act as a substitute and/or partial substitute for, components and/or sub-components of a rig mast, crown, structure, or other such item, without limitation, that exists as part of the rig assembly prior to the addition and/or configuration of an LED lamp assemblies and/or an LED lighting system. Further, there has been a need for LED lighting systems that reduce the effective net added weight and/or minimize the weight/lumen ratio when compared to prior art.

Further still, there remains a need for LED lighting systems that can be configured to a rig as a permanent and/or semi-permanent system thereby minimizing or eliminating the need to remove and/or partially remove the LED lamp assemblies and/or LED lighting system during transportation activities.

In addition, there has also been a need for portable lighting systems for other applications including temporary lighting applications such as interior construction applications that provide desired lighting but that reduce both the size and the weight of the lighting systems.

Further still, it is desirable in certain applications, including the operation of drilling rigs, that the light cast from a high mast does not create excessive light pollution to areas adjacent the work site. As such, the design of a lamp assembly should provide relatively precise light paths that illuminate the desired areas but do not allow excessive light to escape. The design of reflectors can be adjusted to enable sharper boundaries between illuminated and non-illuminated areas from a particular light source. However, as light towers become taller, the precision of these boundaries becomes lower for a given reflector. Tighter boundaries can be achieved by deeper and narrower reflectors; however, this must also be balanced against the proximity of a hot LED near the reflector.

SUMMARY OF THE INVENTION

In accordance with the invention, there is provided an LED lighting system for configuration to a supporting structure, the LED lighting system comprising: a plurality of LED lamps and reflectors within at least one LED lamp assembly; an air flow system having at least one air flow conduit (AFC) for directing air flow against each LED lamp assembly to effect cooling of the LED lamps and to provide structural support to each LED lamp assembly for connection to the supporting structure; and wherein the LED lighting system has a weight/lumen ratio of less than 0.55 g/lumen.

In various embodiments, the LED lighting system has a weight/lumen ratio of less than 0.35 g/lumen and/or less than 0.25 g/lumen.

In various embodiments, the LED lighting system provides greater than 500,000 lumens and/or greater than 1.0 MM lumens.

In further embodiments, each LED lamp assembly includes a lamp assembly housing having a plurality of surfaces for effecting heat transfer of heat from the LED lamps away from the LED lamps.

In other embodiments, each AFC is operatively connected to a lamp assembly housing, the AFC having an air channel for moving cooling air through the AFC and for conveying heat from each LED lamp assembly away from each LED lamp assembly to effect cooling of each LED lamp assembly and to maintain an operating temperature of the LED lamp assembly at or below a threshold temperature during use.

In yet further embodiments, the mass/lumen ratio is realized by a balance of a collective weight and thermal mass of each LED lamp assembly and AFC to provide sufficient structural strength to support the LED lighting system and an adequate thermal mass of each LED lamp assembly housing to effect sufficient cooling when each lamp assembly is operating at ambient temperature and air flow is flowing over each LED lamp assembly.

The system may include a fan system operatively connected to the AFC for actively moving air through the AFC.

In various embodiments, the AFC includes a vertically oriented conduit having a lower air entry and upper air exit and wherein cool air enters the lower air entry and warm heated air exits the upper air exit. The vertically oriented conduit may also include at least one substantially horizontal branch conduit extending laterally from the vertically oriented conduit and wherein each branch conduit operatively and structurally supports at least one lamp assembly housing and/or a heat transfer fin system operatively connected to the AFC.

In other embodiments, the system will include a controller for managing LED lamp assembly temperature, wherein the controller monitors the temperature within an LED lamp assembly and adjusts air flow speed to increase or decrease air flow through the AFC to maintain LED lamp assembly temperature below a pre-determined threshold temperature. The controller may also monitor the temperature within an LED lamp assembly and adjust power to the LED lamp assembly to maintain LED lamp assembly temperature below a pre-determined threshold temperature.

In other embodiments, the system may also include a duct collar operatively connected to a lamp assembly for directing cooling air against a lamp assembly housing at substantially 90 degrees to the lamp assembly.

In various embodiments, each lamp assembly housing has one or more outer edges and includes cooling fins extending radially from a central position on a lamp assembly housing towards each outer edge of the lamp assembly housing for providing an even air flow across the lamp assembly housing.

In other embodiments, the lamp assembly housing has a thermal mass sufficient to effect cooling of the LED lamp assembly and to maintain an operating temperature of the LED lamp assembly at a recommended temperature during use at ambient conditions only when air is flow against the LED lamp assembly housing from the AFC.

In another aspect, the invention provides an integrated lighting and railing system for attachment to a crown of a rig mast comprising: at least one LED lamp assembly, each LED lamp assembly having at least one LED lamp operatively contained within a lamp assembly housing and thermally connected thereto; a combined air flow conduit (AFC) and railing, the combined AFC and railing including at least one substantially vertical and at least one substantially horizontal AFC members, the AFC members arranged as a railing structure and configured for attachment to an upper region of a rig mast, the AFC members supporting the at least one LED lamp assembly and defining an air flow path through the AFC members to each LED lamp assembly to effect cooling of each LED lamp assembly, and wherein the integrated lighting and railing system has railing dimensions substantially corresponding to an existing mast-top steel railing.

In other embodiments, the integrated lighting and railing system includes a forced air system operatively connected to the AFC to move air through the AFC and towards each lamp assembly.

The integrated lighting and railing system may include a controller operatively connected to the forced air system, the controller for controlling a flow rate of air through the AFC, the controller responsive to a measured temperature at one or more LED lamp assemblies to increase or decrease the flow rate of air based on a measured temperature.

In various embodiments of the integrated lighting and railing system, the lamp assembly housing has a thermal mass sufficient to effect cooling of the LED lamp assembly and to maintain an operating temperature of the LED lamp assembly at a recommended temperature during use at ambient conditions only when air is flow against the LED lamp assembly housing from the AFC.

The integrated lighting and railing system may be configurable to a drilling rig mast, provides greater than 0.5 MM lumens and has a net added weight/lumen ratio of less0 than 0.55 g/lumen and/or provides greater than 0.5 MM lumens and has a net added weight/lumen ratio of less than 0.35 g/lumen and/or provides greater than 0.5 MM lumens and has a net added weight/lumen ratio of less than 0.25 g/lumen and/or provides greater than 1.0 MM lumens and has a net added weight/lumen ratio of less than 0.55 g/lumen and/or provides greater than 1.0 MM lumens and has a net added weight/lumen ratio of less than 0.35 g/lumen and/or provides greater than 1.0 MM lumens and has a net added weight/lumen ratio of less than 0.25 g/lumen and/or provides greater than 1.0 MM lumens and has a net added weight/lumen ratio of less than 0.20 g/lumen.

In various embodiments, the LED lamp assemblies are retractable with respect to a central axis of the rig mast to enable transportation of the rig mast with the LED lighting system attached.

In another aspect, the invention provides method for retrofitting an LED lighting system to a rig mast to reduce a net added weight of the LED lighting system to the rig mast, the method comprising the steps of: a) removing existing mast-top steel railings from a rig mast; and, b) attaching an integrated lighting and railing system to the mast top, the integrated lighting and railing system having at least one LED lamp assembly, each LED lamp assembly having at least one LED lamp operatively contained within a lamp assembly housing and thermally connected thereto; and a combined air flow conduit (AFC) and railing, the combined AFC and railing including at least one substantially vertical and at least one substantially horizontal AFC members, the AFC members arranged as a railing structure and configured for attachment to an upper region of a rig mast, the AFC members supporting the at least one LED lamp assembly and defining an air flow path through the AFC members to each LED lamp assembly to effect cooling of each LED lamp assembly and wherein the integrated lighting and railing system has railing dimensions substantially corresponding to the existing mast-top steel dimensions.

In another aspect, the invention provides an LED lighting system comprising: an LED circuit board having a support matrix supporting at least one LED lamp and power conducting trace; a reflector operatively configured over each LED lamp and to the LED board, the reflector having a reflector base for operative positioning over the LED lamp and a reflector body for directing LED light away from the reflector; a heat sink in thermal contact with an outside surface of the reflector adjacent the reflector base and the LED board, the heat sink for conveying LED lamp heat away from inside surfaces of the reflector; and, an LED housing operatively configured to the LED board, the LED housing having a thermally conductive body for conveying heat away from the LED housing.

In a further aspect, the invention provides a control system for an LED light system having at least one LED lamp assembly, each LED lamp assembly having a plurality of LED lamps operatively contained within an LED housing, an air flow conduit (AFC) operative configured with a fan system to deliver cooling air to each LED lamp assembly, the control system for controlling power to the LED lamps and to maintain an operating temperature within a desired range, the control system comprising: a power driver operatively connected to a power supply and to the LED lamps of an LED lamp assembly; a temperature sensor and controller operatively connected to each LED housing for monitoring the temperature of the LED housing, the temperature sensor and controller for reporting the temperature of the LED housing to the power driver; and wherein the power driver increases or decreases power to the LED lamps in response to the temperature of the LED housing and wherein if the temperature of the LED housing is above a threshold, power is reduced to the LED lamps, and wherein if the temperature is below a threshold, power is increased to the LED lamps up to a pre-determined power threshold.

In one embodiment, the system further includes a fan driver operatively connected to the power supply and wherein the fan driver activates the fan above a temperature threshold and deactivates the fan below a temperature threshold.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

With reference to the Figures, LED lamp assemblies and LED lighting systems are described that combine structural and heat dissipation properties in combined systems that significantly reduces the weight of LED lamp assemblies and LED lighting systems.

Although many of the Figures illustrate and/or describe configuration to drilling rigs with higher lumen outputs, these are not meant to be limiting and it is understood that the systems described can be modified for configurations with applicability to smaller service rigs, other rigs of various heights, weights, geometry, etc. and are within the scope and spirit of the present invention. The systems described herein may also be integrated with other support systems. Various embodiments and aspects of the current invention are described that achieve one or more of the following:

a. provide a desired level of lighting;
b. reduce the overall net weight of an LED lighting system when compared to prior art systems;
c. reduce the mass/lumen ratio of a LED lamp assembly and/or the mass/lumen ratio of an LED lighting system
d. provide sufficient heat dissipation capabilities for the desired lighting;
e. provide robust structural support to enable deployment in a variety of applications and particularly elevated structure applications;
f. for drilling and service rig mast LED lighting systems, reduce the "net added weight" at the upper section of the mast by integrating and/or at least partially replacing, displacing and/or subsidizing functional uses and weights of other structural features of the rig mast at least partially with at least some aspects or components of the LED lighting system;
g. provide a controller that manages the power delivery to LED lighting systems to align with the sunrise and sunset of any particular location;
h. provide a power backup system to ensure uninterrupted LED lighting when the main site power fails.
i. provide reflector optics enabling effective light projection over a defined area while reducing light pollution outside a projection area as well as defined blind spots when desired.
j. provide a control system that enables effective interconnection of a number of lamp assembly modules depending on lighting needs.

To achieve these objectives, the LED lighting systems and LED lamp assemblies described herein utilize combinations of separate and integrated LED housings, heat transfer/air flow conduits and support systems that enable effective heat dissipation through the support system or cooling air through the heat transfer conduits and/or support system. Generally, the LED lighting systems are operated to maintain an operating temperature of individual LEDs at or around a recommended operating temperature.

Figure 1A:
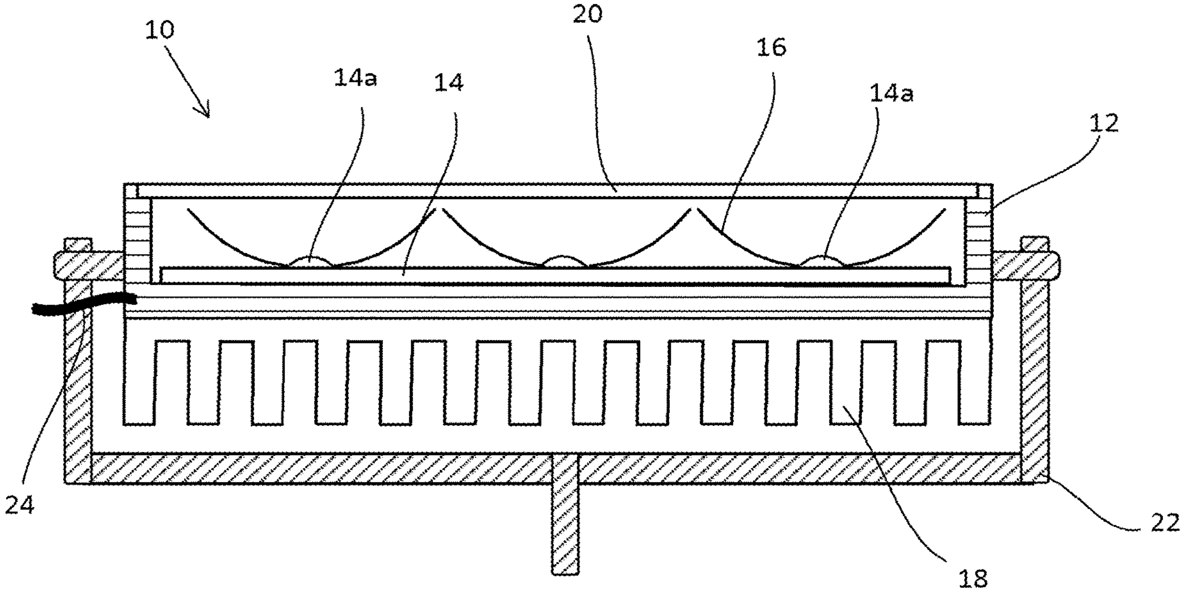
FIGURE 1A PRIOR ART
FIGS. 1A and 1B are schematic cross sectional (FIG. 1A) and top (FIG. 1B) views of a typical prior art LED lamp assembly having LEDs within a housing.
Figure 1B:
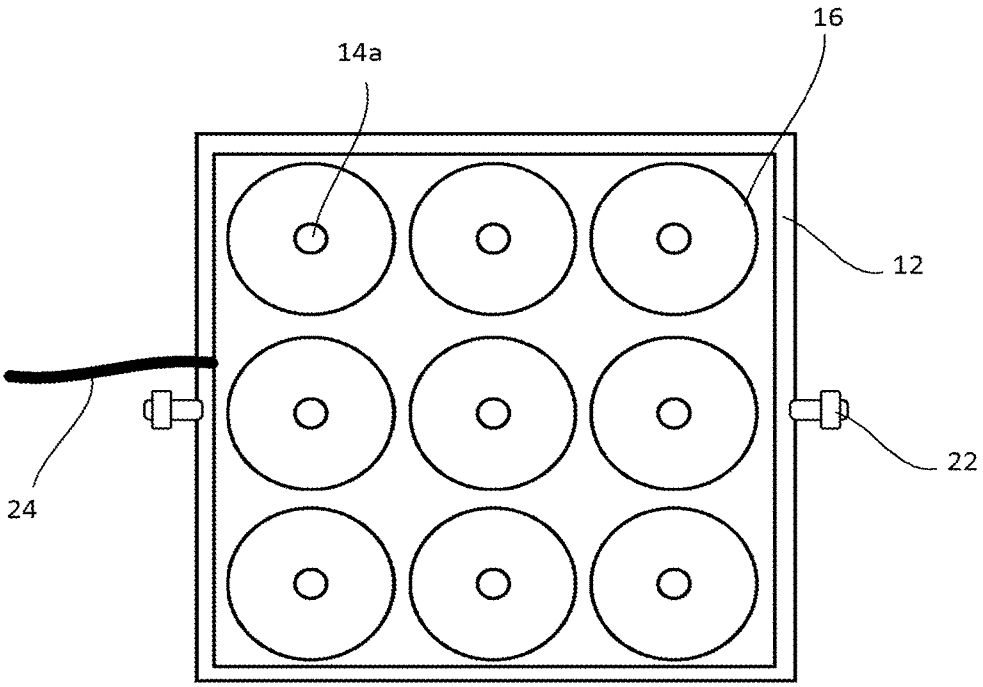
FIGURE 1B PRIOR ART
Figure 2:
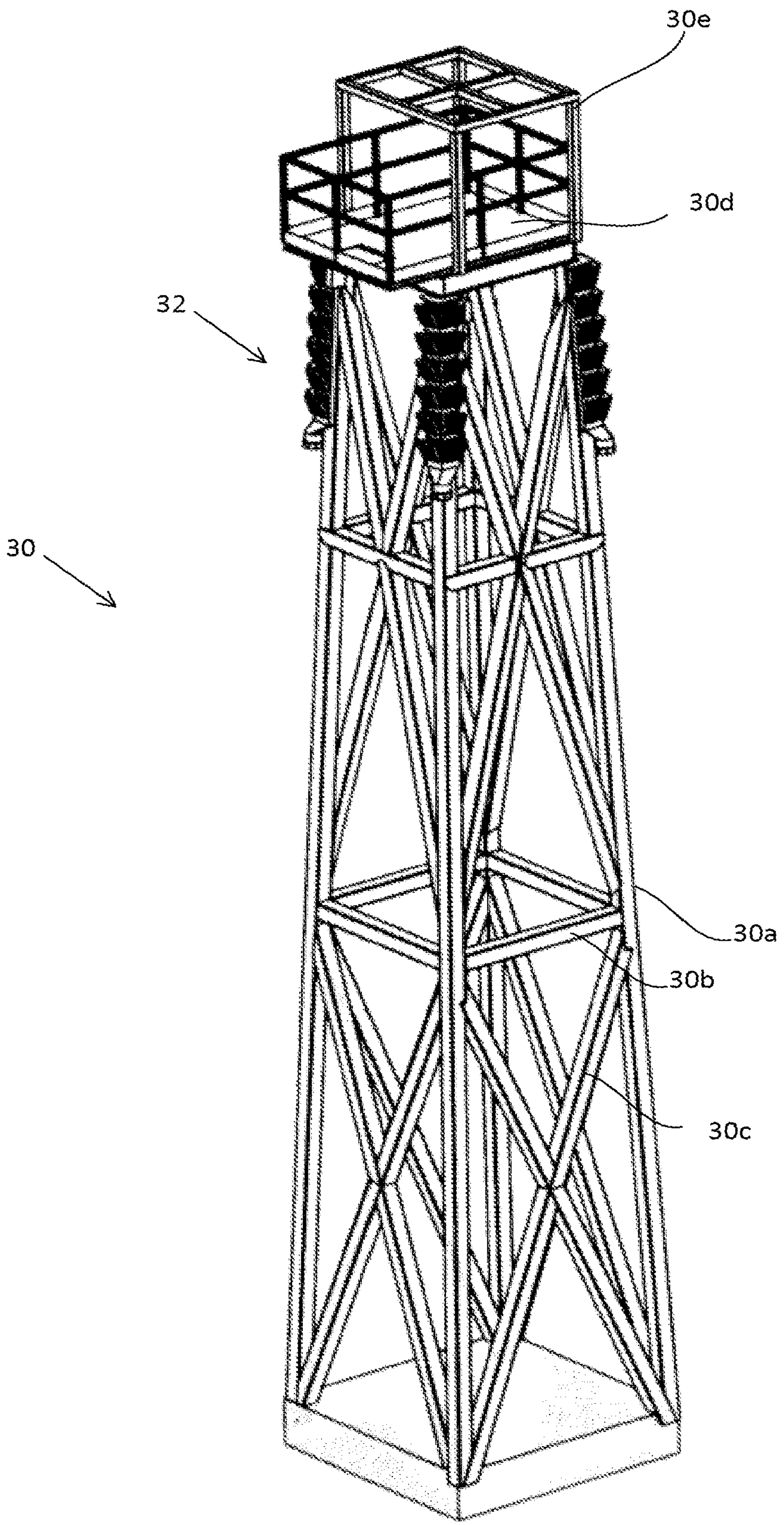
FIGS. 2, 2A, 2B, 2C, 2D, 2E, 2F and 2G are various perspective views (FIGS. 2-2F) and a cross-sectional view (FIG. 2G) of a lighting system having a heat transfer conduit (HTC) in accordance with one embodiment of the invention.
Figure 2A:
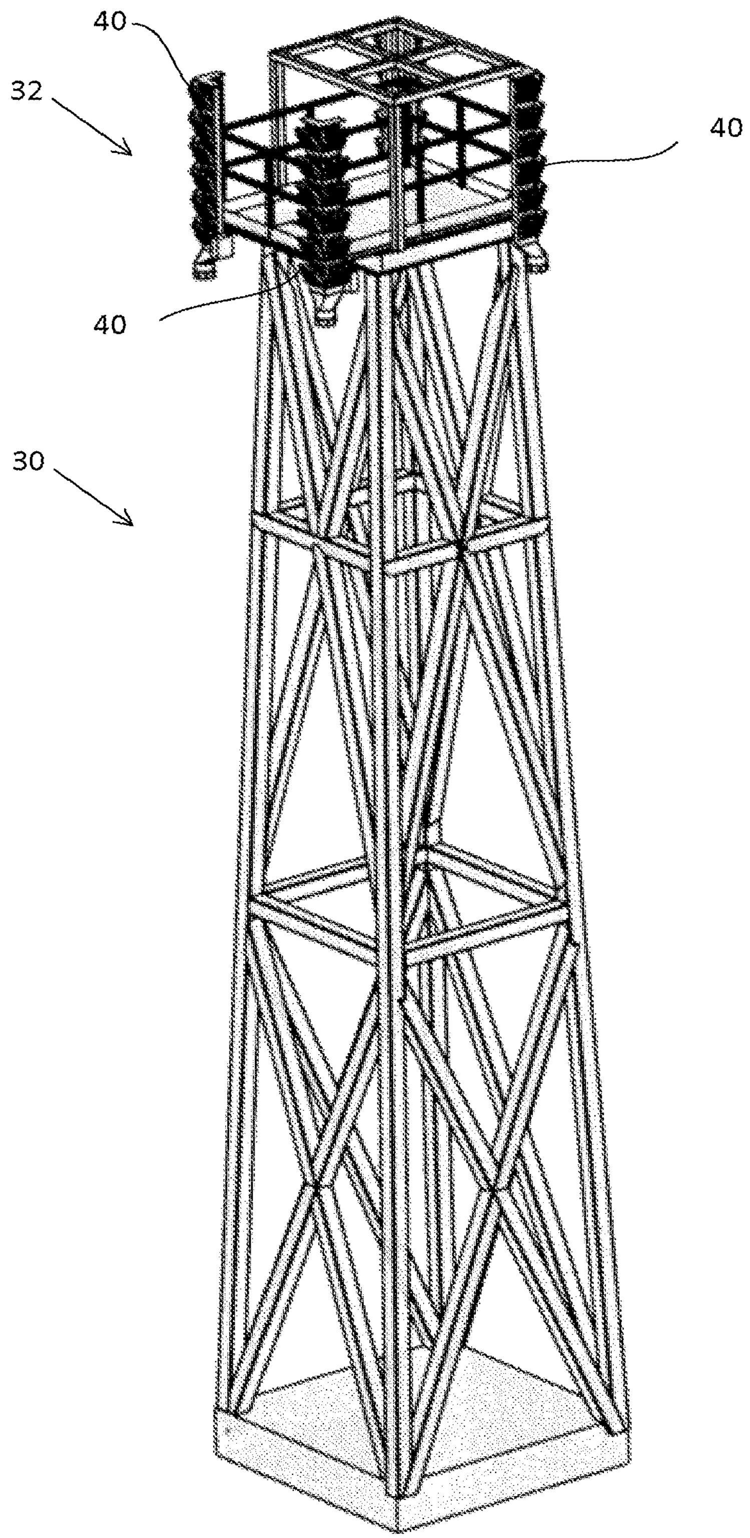

FIG. 2 shows a typical drilling mast system 30 having a representative lighting system 32 in accordance with one embodiment of the invention mounted to upper corners of a drilling mast. For the purposes of illustration, as is known a typical drilling rig mast includes a number of substantially vertical members 30*a*, horizontal members 30*b* and various cross members 30*c*. The typical mast will include an upper deck platform 30*d* having a railing 30*f* and potentially other top mounted structures 30*e* such as a cage railing. FIG. 2A shows a lighting system 32 mounted to the upper railings of the drilling mast.

In a first embodiment, and as shown in greater detail in FIGS. 2B-2G, an LED lighting system 32 includes separate corner-mounted LED lighting assemblies 40 each having a plurality of LED lamp assemblies 40*a*. The LED lamp assemblies 40*a* are connected to and supported by an air flow conduit (AFC) 40*b* that has a generally hollow interior enabling air to be drafted upwardly through the AFC. The AFC provides structural support to the LED lamp assemblies 40*a* and enables effective heat dissipation from the LED lamp assemblies to maintain desired operating temperatures within each LED lamp assembly and LED. The AFC is attached to the drilling mast via appropriate connectors and will generally be installed in a substantially vertical orientation. Within the AFC, a system of cooling fins 40*c* (see FIG. 2G in particular) is preferably configured to increase the surface area of the AFC and otherwise improve heat transfer from the system.

As shown, each of the LED lamp assemblies 40*a* is pivotally connected to the AFC allowing individual manipulation of an LED lamp assembly for directing light where it may be required. Power for the LED lamp assemblies is provided by a power controller 42 mounted to each AFC.

Figure 2B:
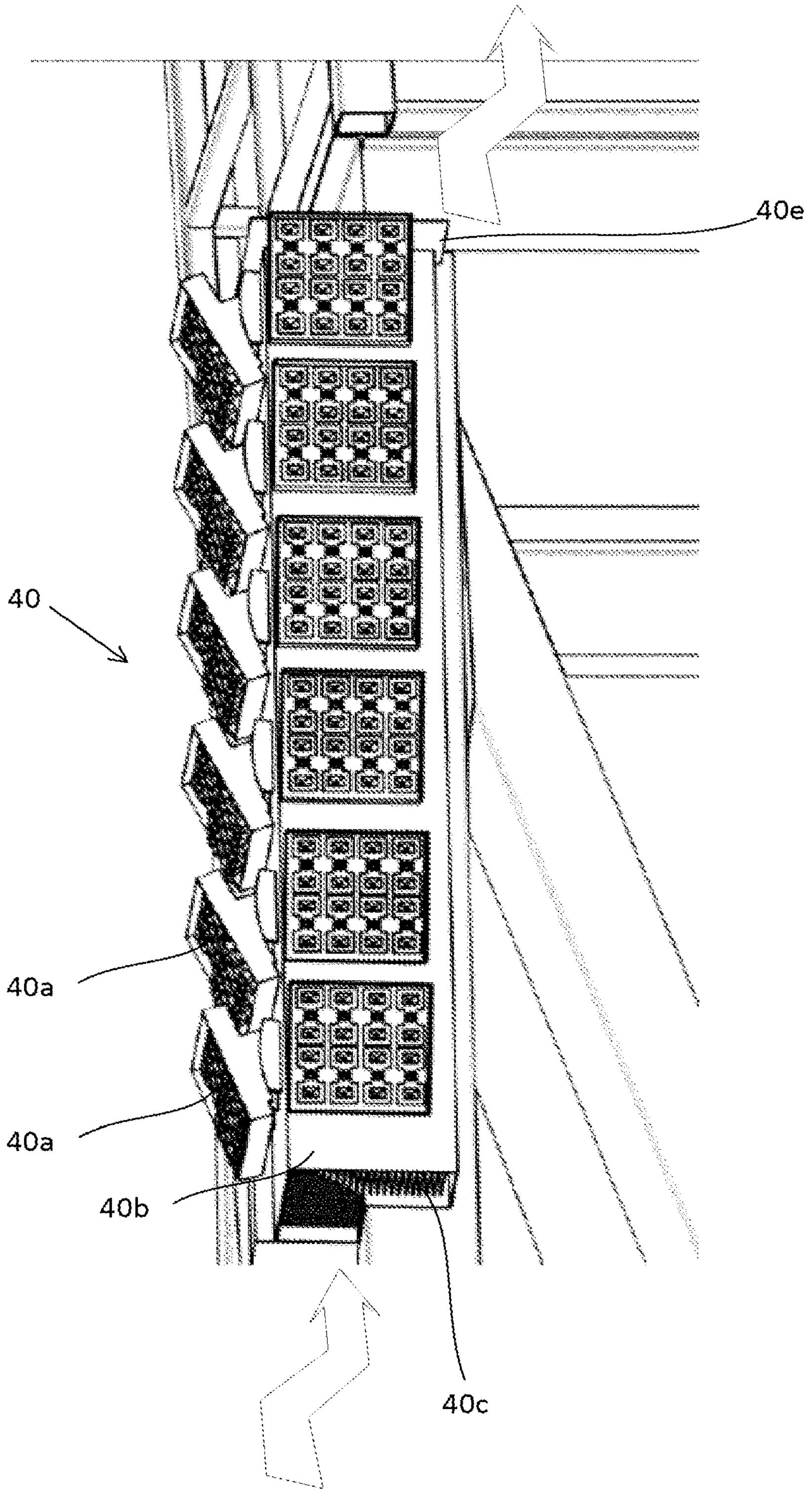
Figure 2C:
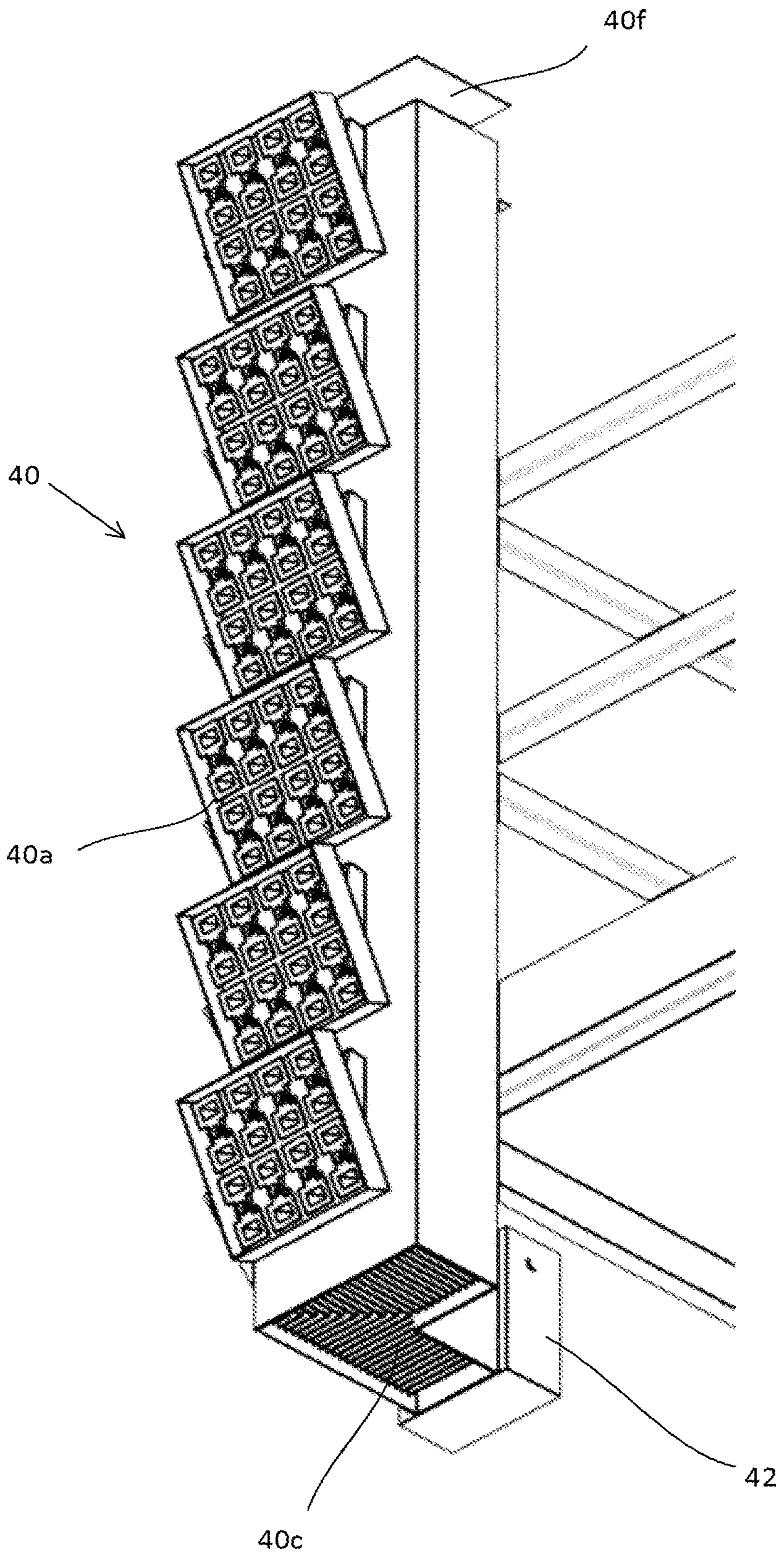
Figure 2D:
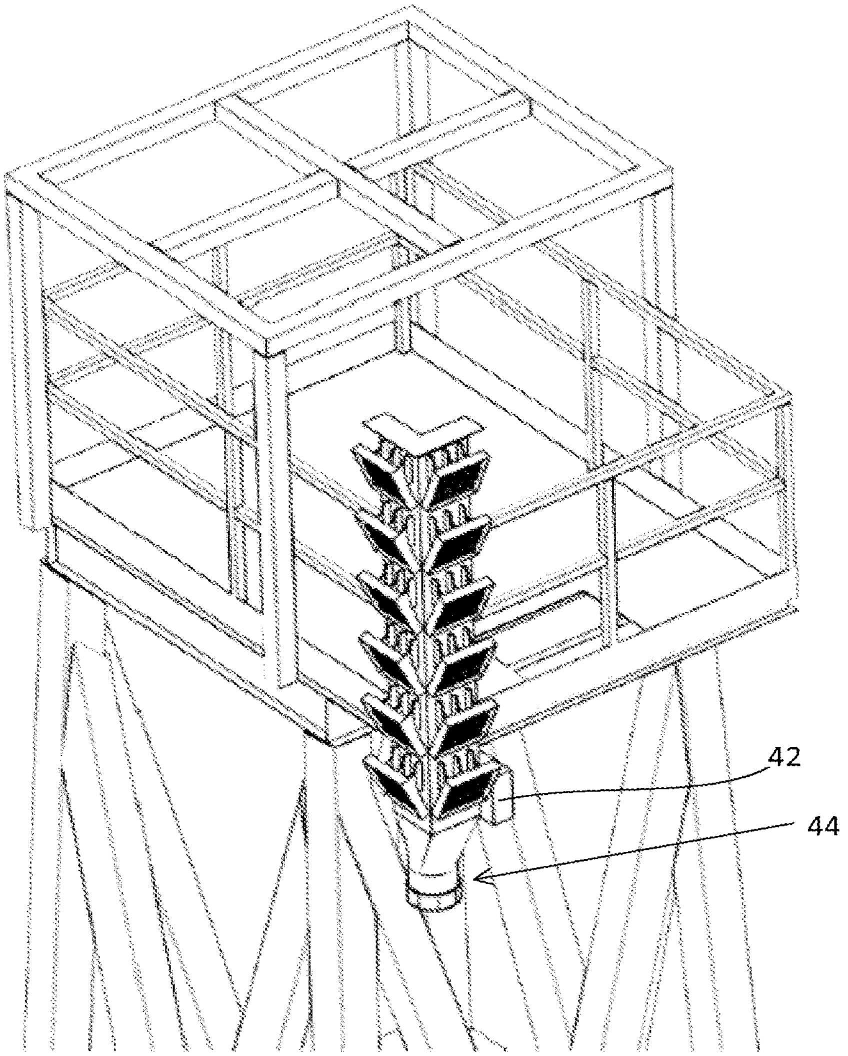
Figure 2E:
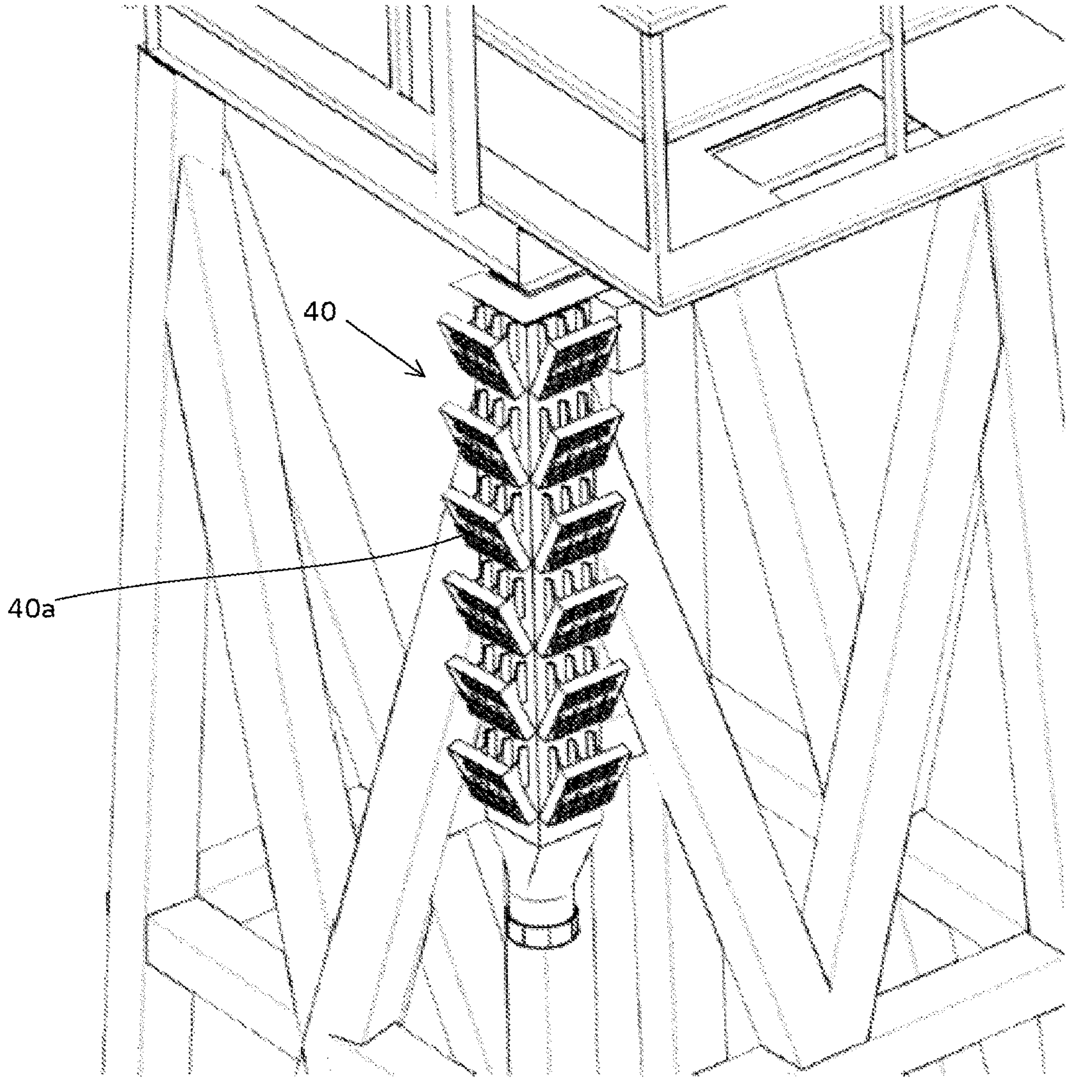
Figure 2F:
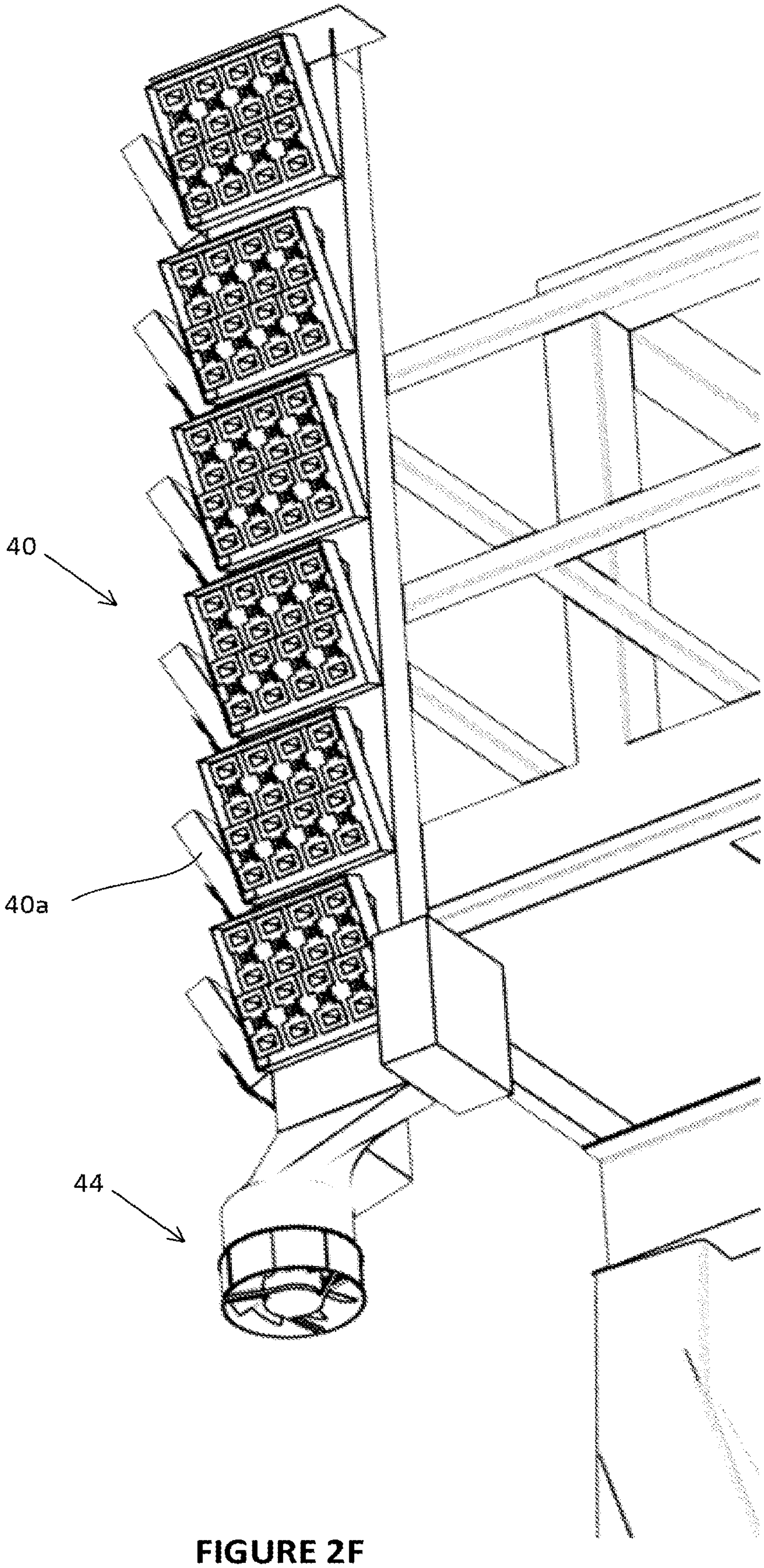
Figure 2G:
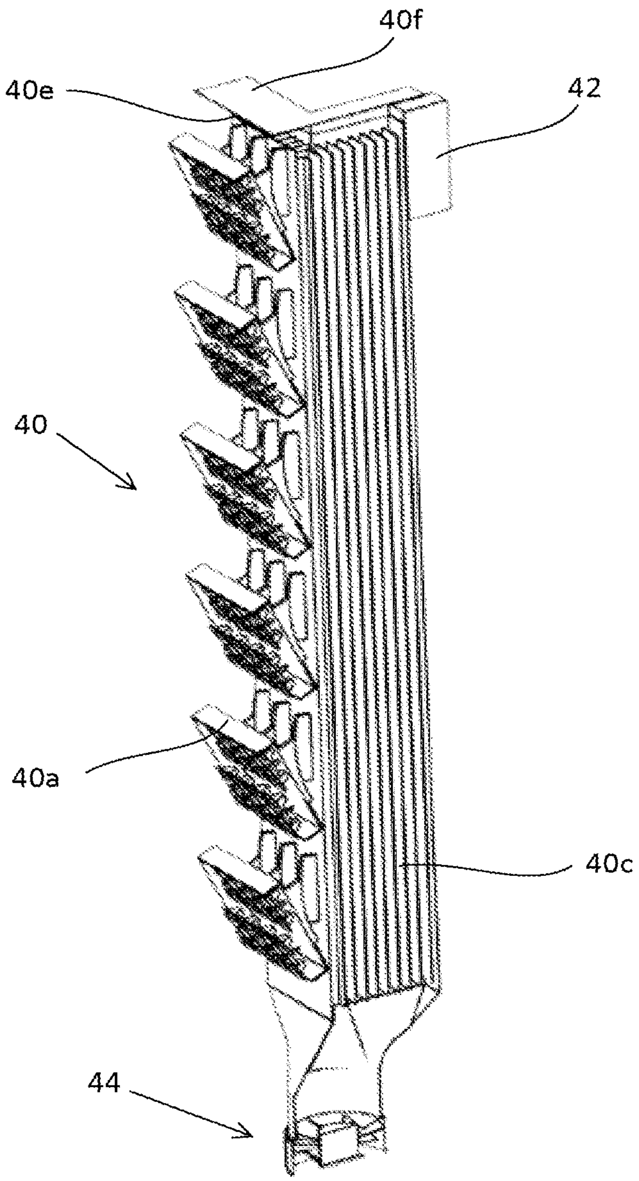

In the embodiment shown in FIGS. 2B and 2C, air may passively draft upwardly through the AFC from a lower entry position 40*d* to an upper exit position 40*e*. In this example, heated air within the AFC and derived from the LED lamp assemblies will rise within the AFC to create an air draft such that colder air is drawn in at the entry position 40*d* and warmer air is expelled through the exit 40*e*. The upper exit position may include a cap 40*f* to prevent precipitation from entering the AFC.

As shown in FIGS. 2D-2G, in one embodiment, a forced air convention system may be provided to actively move air through the AFC via a fan system 44. In this case, a fan having fan blades and a motor is configured to the AFC at the lower entry 40*d* and operates to pull cold air into the AFC and move it upwardly towards the exit 40*e*.

Figure 3:
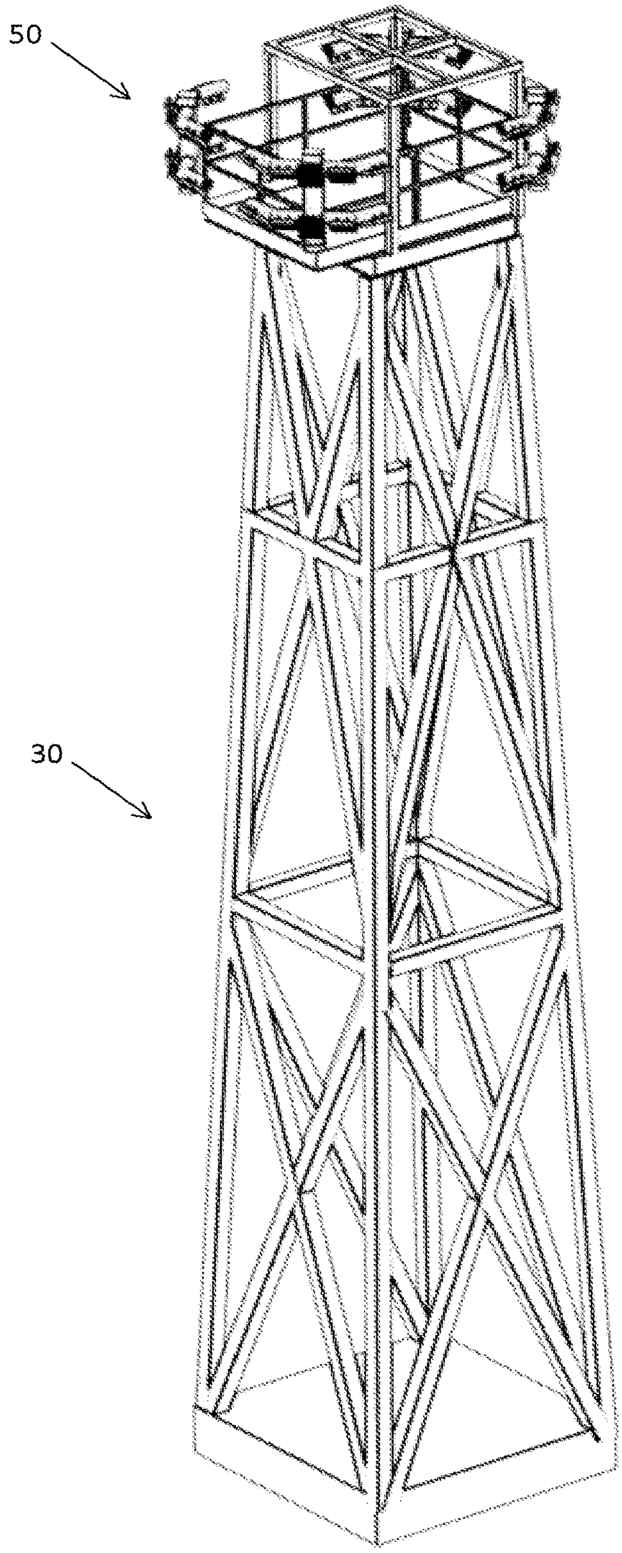
FIGS. 3, 3A, 3B, 3C and 3D are various perspective views (FIGS. 3-3C) and a cross-sectional view (FIG. 3D) of an LED lighting system having a branched heat transfer conduit (HTC) in accordance with one embodiment of the invention.
Figure 3A:
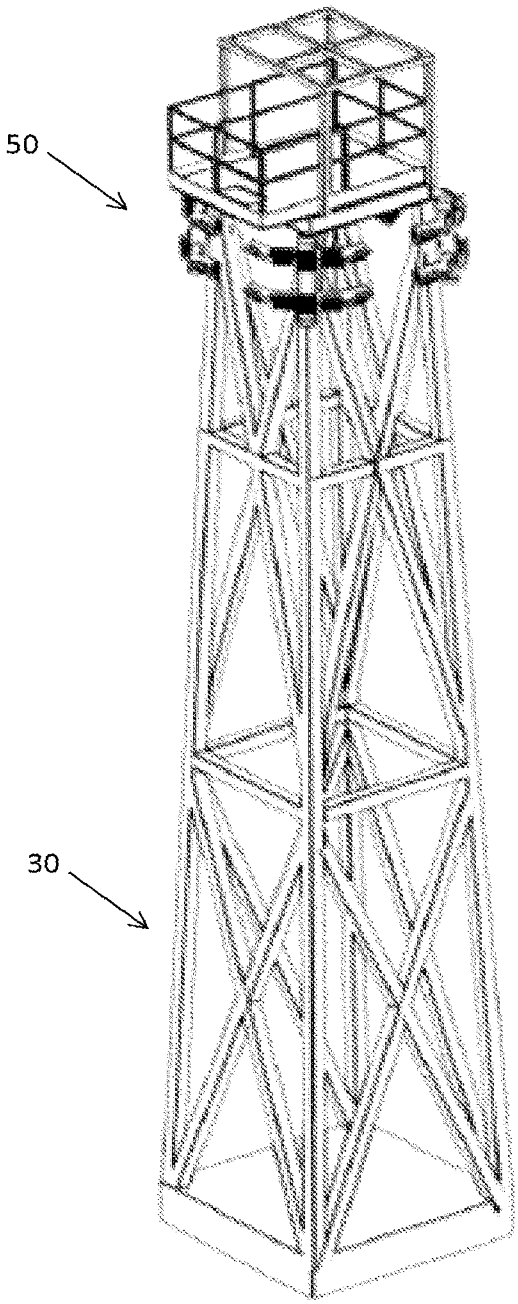
Figure 3B:
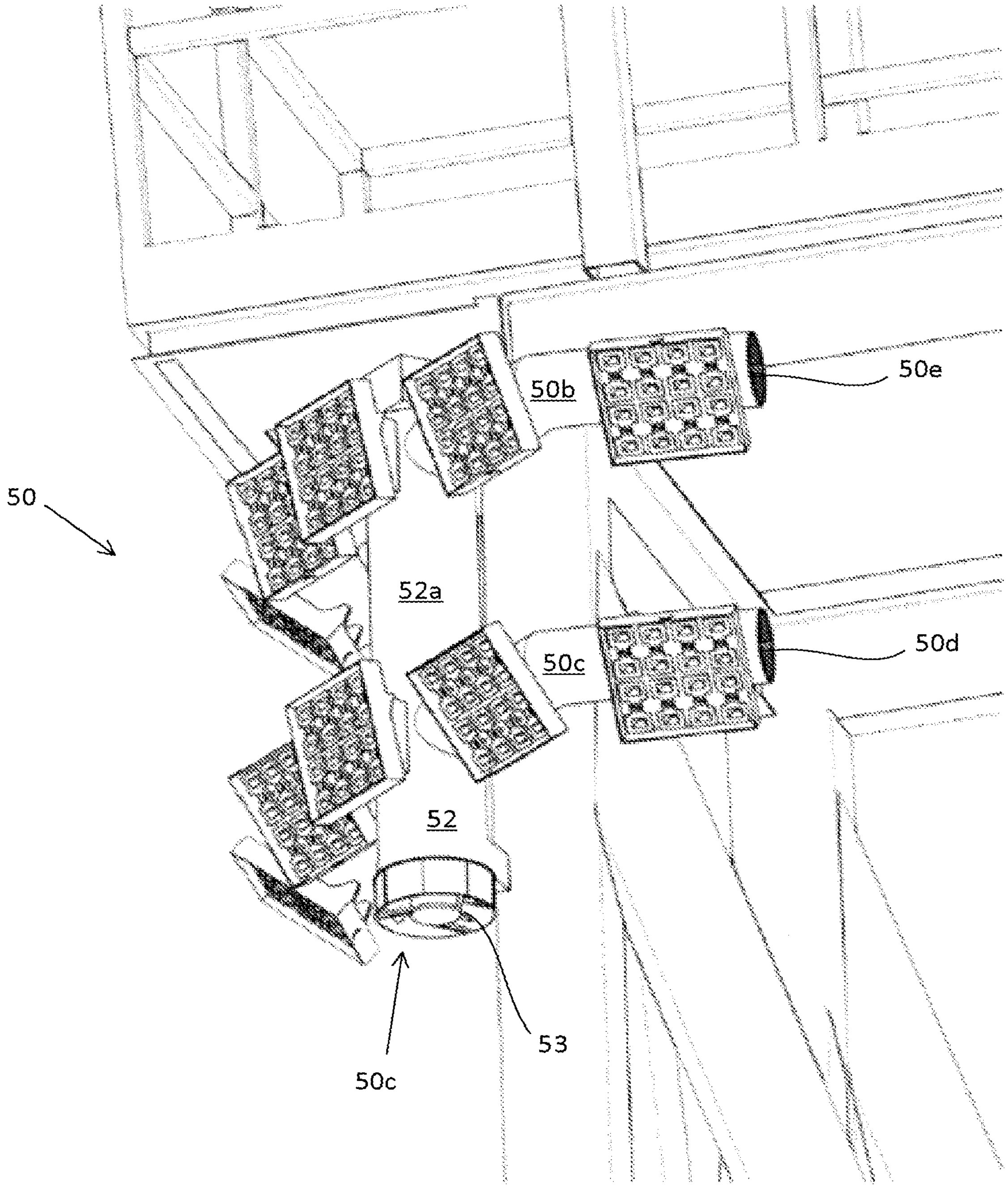
Figure 3C:
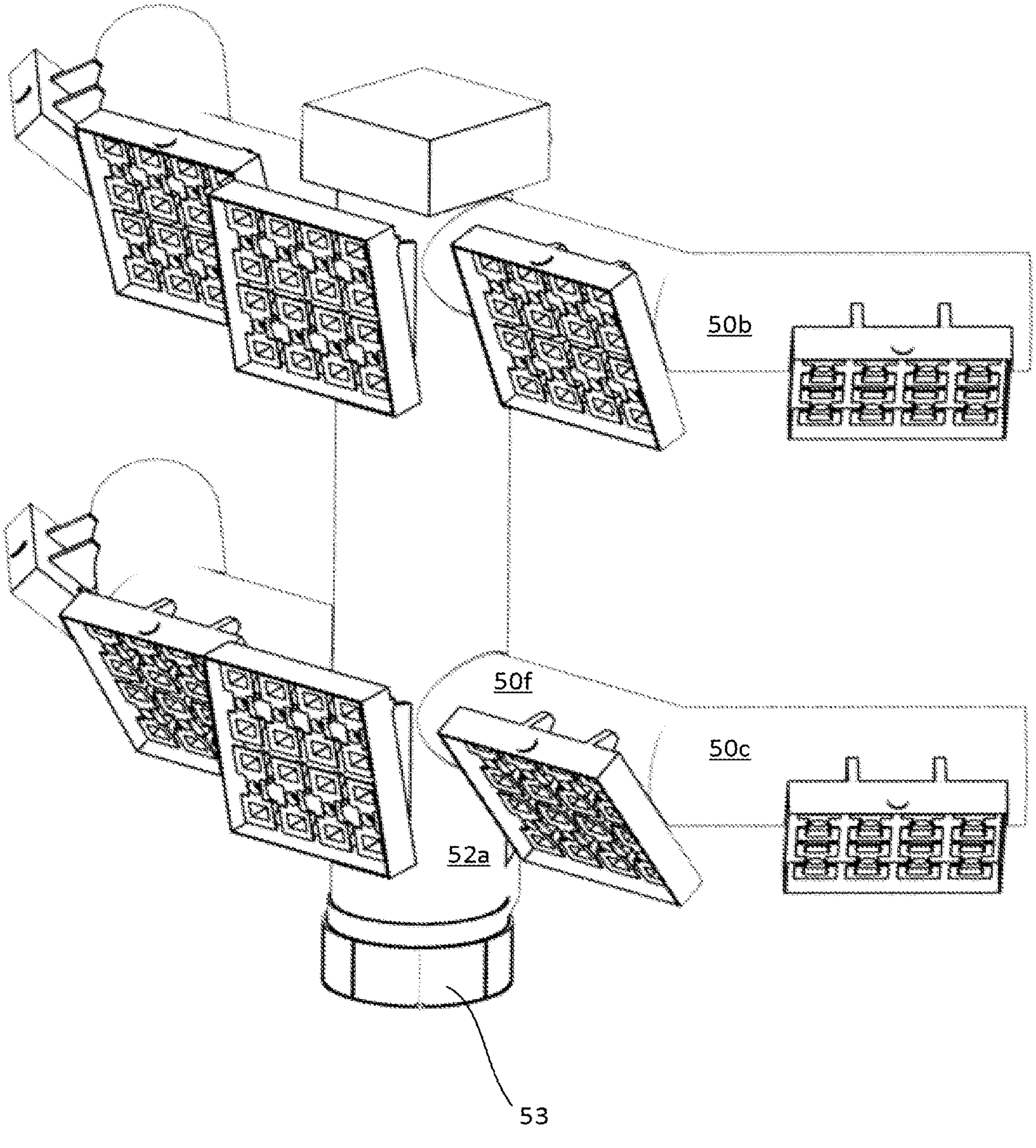
Figure 3D:
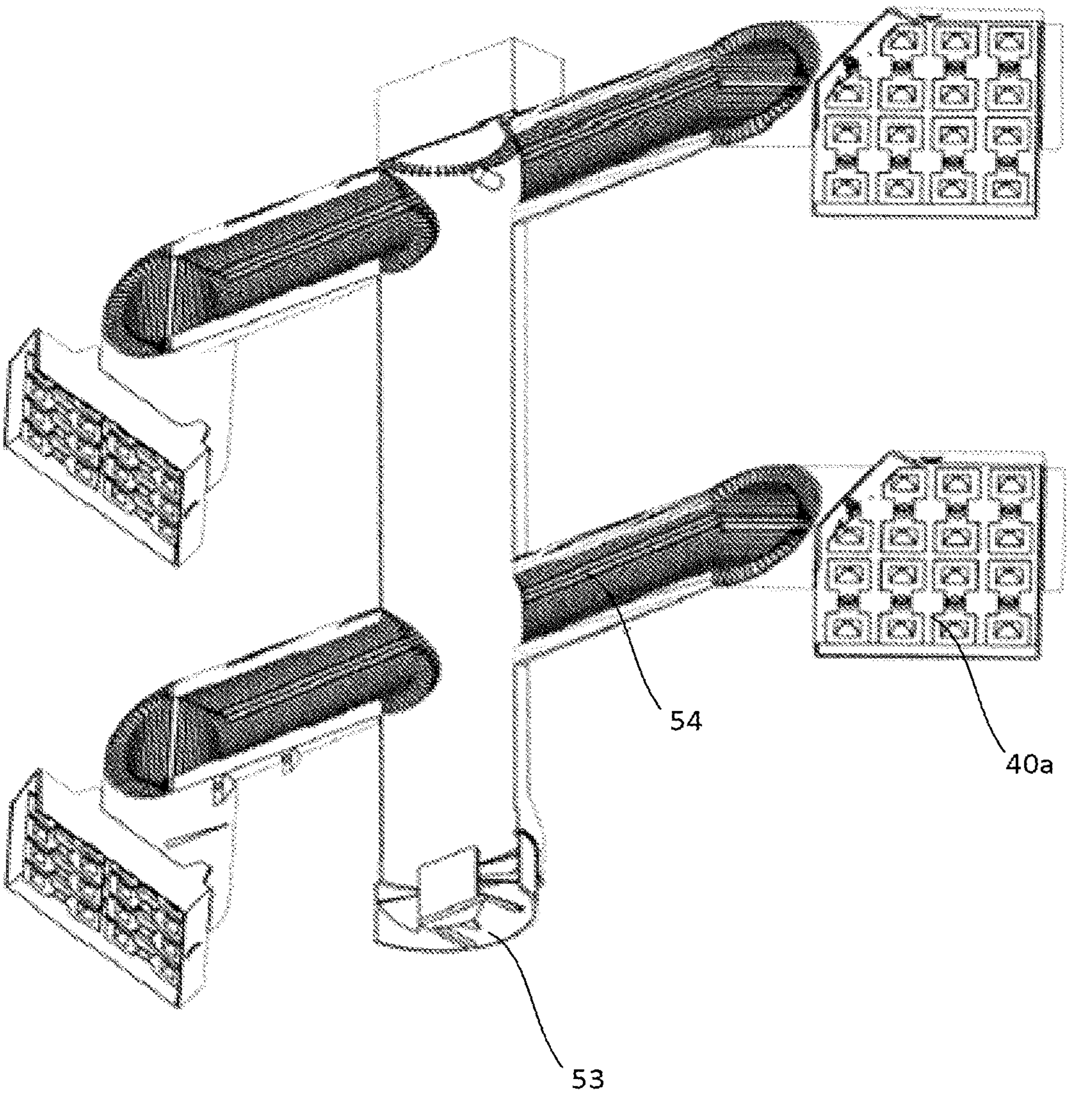

In another embodiment, as shown in FIGS. 3-3D, a branched AFC lighting system 50 is described. In this embodiment, a branched AFC conduit 52 has a vertical conduit 52*a* and two or more horizontal conduits 52*b,c* (or substantially vertical and substantially horizontal). FIG. 3 shows a branched system 50 configured to the upper railings of a drilling mast and FIG. 3A shows a branched lighting system 50 configured to the upper corners of a drilling mast. As with the other embodiments, air can be moved through the system from a lower entry position 50*c* by fan 53, upwardly and then outwardly from two or more branches exits 50*d*, 50*e*. As shown, LED lamp assemblies 40*a* may be mounted to the vertical 52*a* and horizontal conduits 52*b,c*. Each branch may be coplanar (e.g. 50*b*, 50*c*) with one another and may also include additional non-coplanar branches (e.g 50*f*, 50*c*).

As shown in FIG. 3D, the branched AFC will preferably include internal fins 54 to increase the surface area for heat dissipation.

Importantly, for each of the above described embodiments, the AFC provides a combination of heat sink capabilities and structural support for a plurality of LED lamp assemblies. In contrast, prior art systems provide only provide heat sink capabilities through non-structural members.

Figure 4:
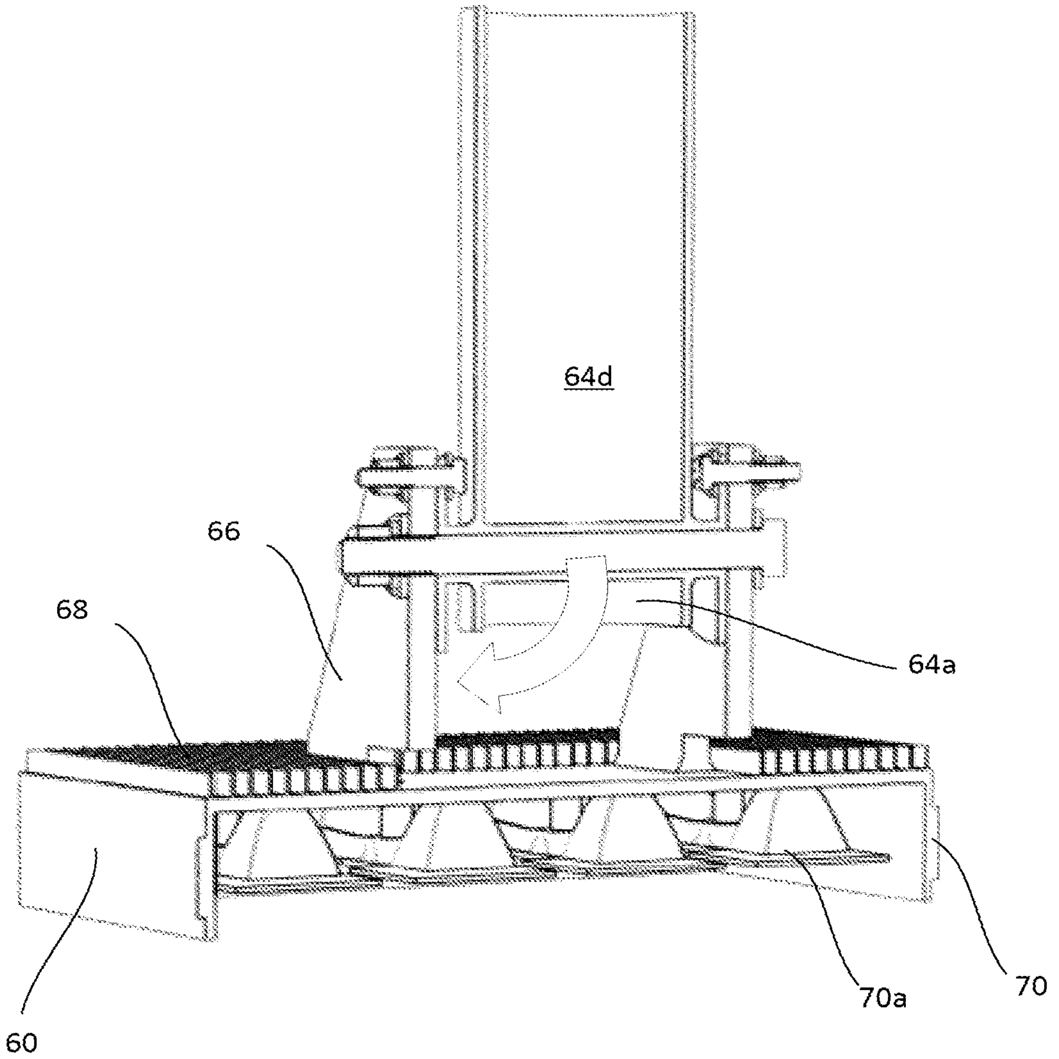
FIGS. 4 and 4A are a cross-sectional view (FIG. 4) and perspective view (FIG. 4A) of a ducted cooling system in accordance with one embodiment of the invention and FIG. 4B is perspective view of a ducted cooling system having radial fins on a lamp assembly in accordance with one embodiment of the invention.
Figure 4A:
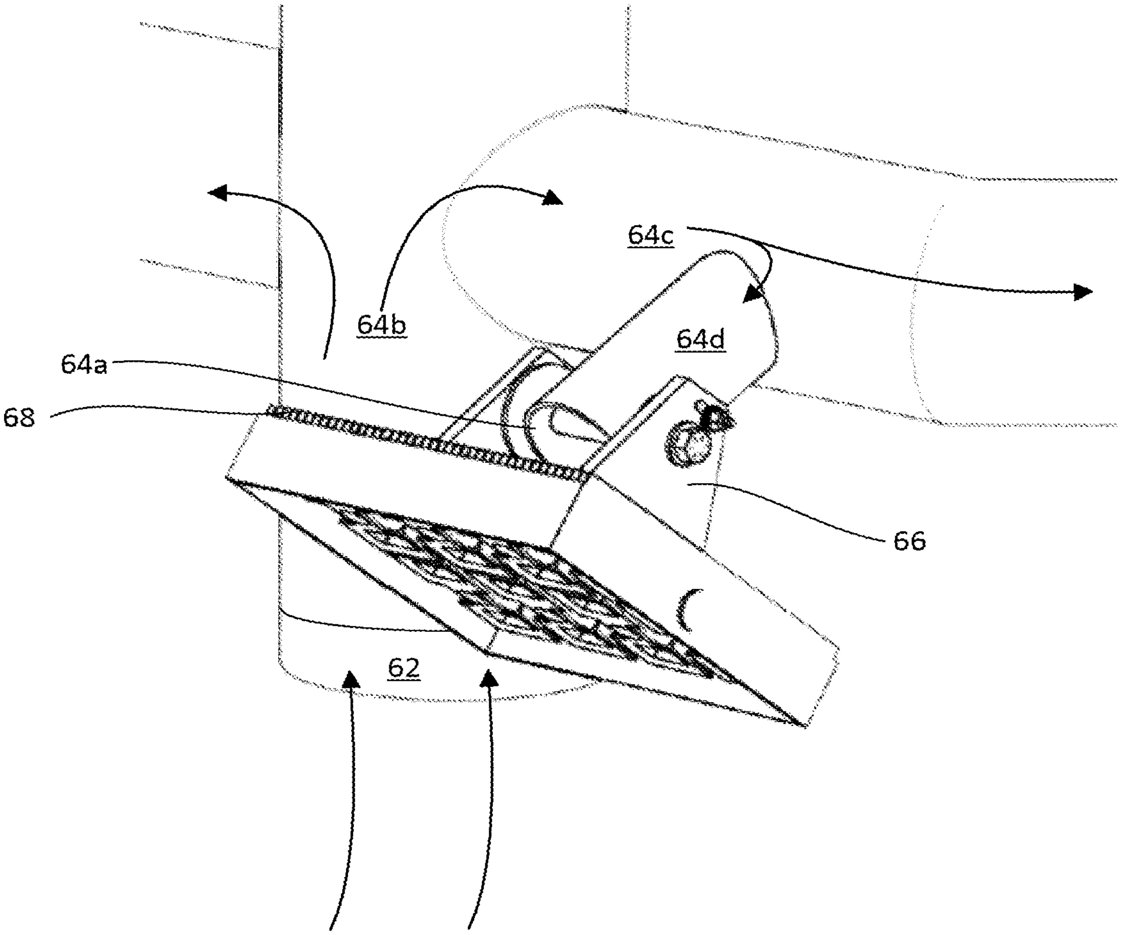
Figure 4B:
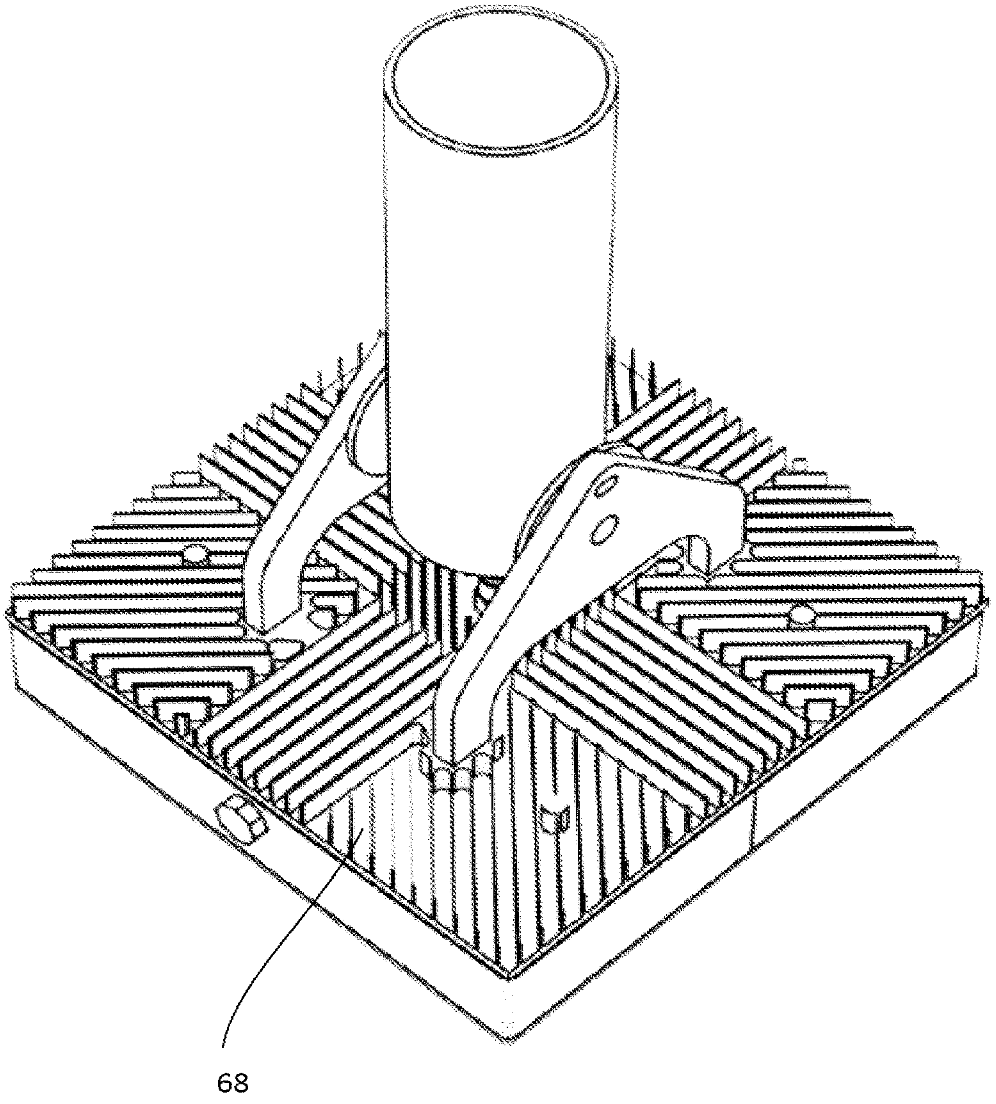

FIGS. 4 and 4A show another embodiment similar to the branched AFC above but where cooling air is actively pushed against an LED lamp assembly 60. In this embodiment, a fan system 62 drafts air through additional AFC 64 having an LED lamp assembly 60 adjacent a conduit exit 64*a*. In this case, a combination of vertical 64*b* and horizontal 64*c* and angled 64*d* conduits collectively provide air movement from the fan system to the exits 64*a*. As shown, each LED lamp assembly 60 has a bracket connection system 66 and system of cooling fins 68. Importantly, in this embodiment, the cooling fins 68 may be substantially smaller and lighter than the cooling fins on a prior art lamp assembly as sufficient heat transfer from the LED lamp assembly is enabled due to the active air flow over the cooling fins. In one embodiment (FIG. 4B), the cooling fins may be arranged in a generally radial pattern (or spiral pattern (not shown)) from the center of the back of the lamp assembly to provide radial channels to the outside edges of the lamp assembly to the flow of air from the conduits. A generally radial or spiral pattern of cooling fins helps promote an even flow of air over the entire surface of the lamp assembly thus providing even cooling to all lamps within the lamp assembly as well as continuous air cleaning of the cooling fins. Importantly, the cooling fins in these embodiments would generally not be sufficient to enable the LED lamp assembly to operate at the desired light output as a standalone lamp assembly. That is, sufficient cooling is normally only achieved by the movement of cooling air over the LED lamp assembly, particularly when operating at ambient temperatures at, around or above 20° C.

In various embodiments, the cooling fins 68 may be partially enclosed via additional ducting to manage air flow over the cooling fins.

Figure 4C:
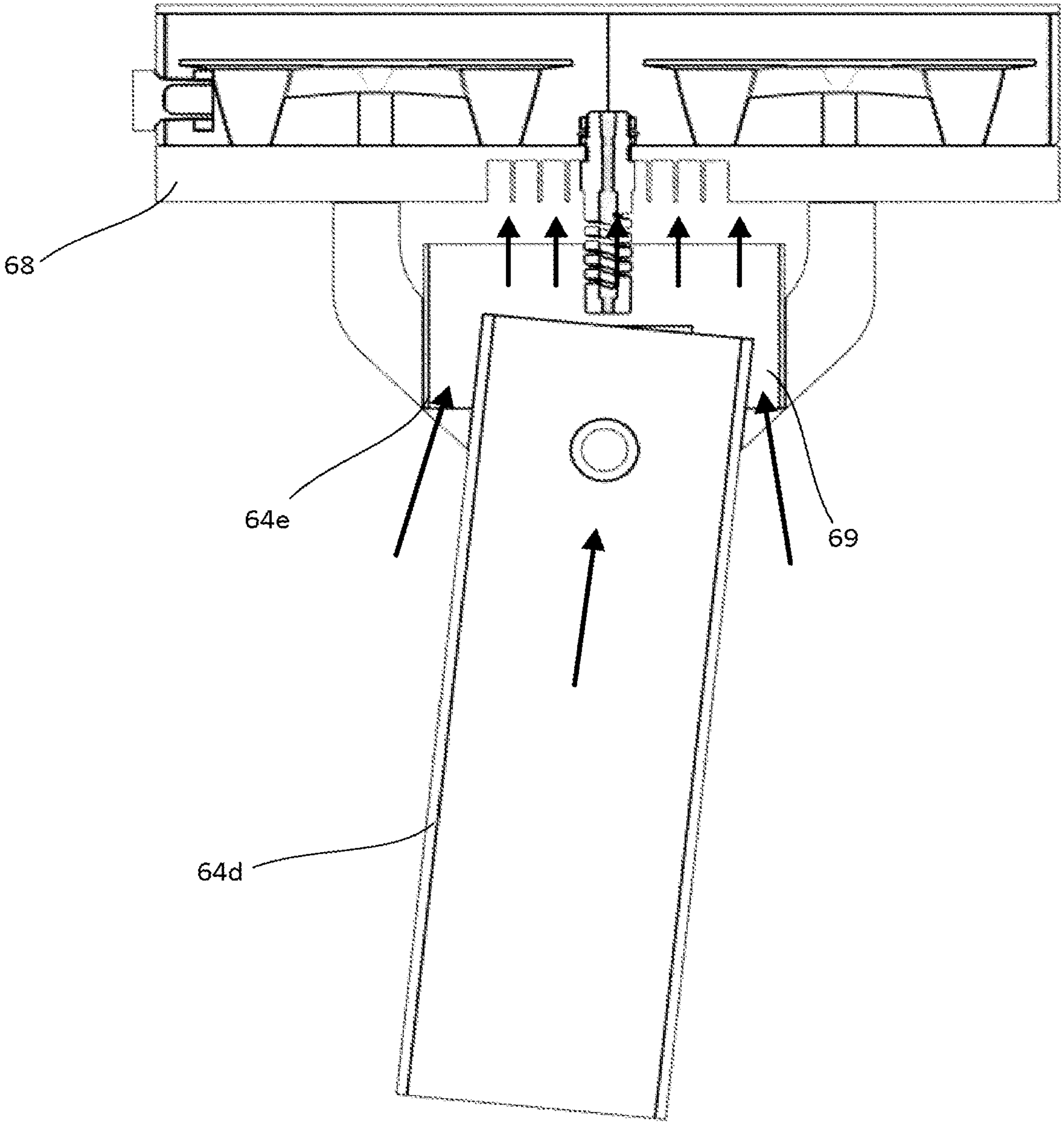
FIGS. 4C and 4D are schematic cross-section and perspective views of an LED lamp assembly having a ducted collar to provide even air flow to an LED lamp assembly in accordance with one embodiment of the invention.
Figure 4D:
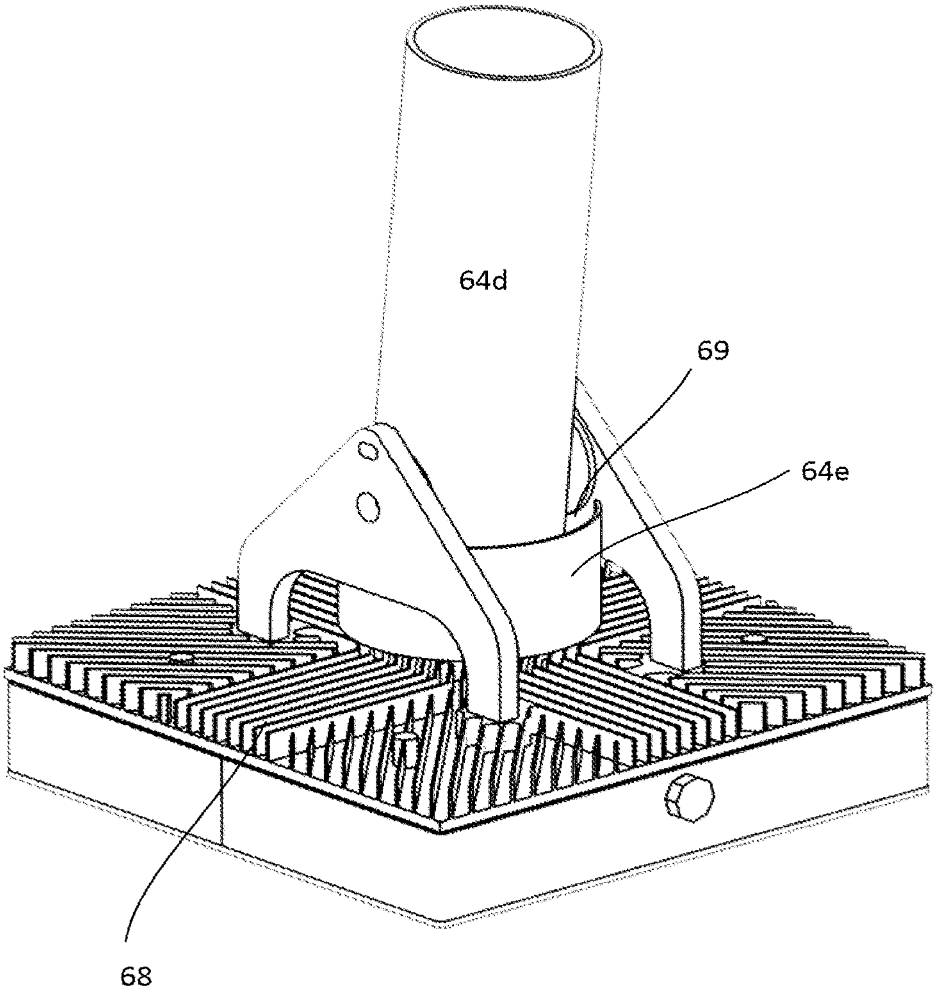

FIGS. 4C and 4D show one embodiment having a duct collar 64*e* to promote an even flow of air over the cooling fins. In this case, a duct collar is pivotally connected to angled conduit 64*d* to direct air flow against cooling fins 68 in a substantially perpendicular direction to the cooling fins and/or in a direction that promotes passage of the cooling air through the cooling fins. That is, by providing a short channel that directs cooling air through the cooling fins, air will be directed more evenly across the back of the LED lamp assembly. In one embodiment, a small gap 69 is provided between the duct collar and angled conduit to enable an increased air flow against the cooling fins through the duct collar. That is, the movement of air through the duct collar will draw additional air in through the gap 69 thus increasing air flow.

Weight Reduction

By moving the heat sink capabilities and/or air flow to the structural members, the weight of each LED lamp assembly can be reduced by reducing the size of or eliminating heat sink fins from the housing.

Potential weight reductions are illustrated by way of example and as shown in Table 2 for various sub-assemblies of an LED lighting system. In this representative example, for 16 LEDs contained within a lamp housing 210 (FIG. 7A for example), the total weight of a LED lamp assembly including 16 LED lamps, an aluminum housing, cabling and housing covering can be reduced to approximately 2-3 kg as compared to current systems having passively cooling fins mounted to the housing and which typically weigh 12 kg each.

TABLE 2

Representative Weights of Lighting System Sub-Assemblies for a 1.2 MM total lumen LED Lighting System and Mass/Lumen

| Sub-Assembly/ Parameter | Weight (lbs) [kgs] | Number | Total Weight (lbs) [kgs] |
|---|---|---|---|
| LED Lamp Assembly | 6 [2.7] | 6 per corner | 36 [16.3] |
| Air Flow Conduit and Electrical Assembly | 46 [30.4] | 2 per corner | 92 [41.8] |
| Support Frame | 20 [9.1] | 1 per corner | 20 [9.1] |
| Total Weight | | | 148 [67.2] |
| Total Weight for 4 corners of mast | | | 592 [268.8] |
| Mass/Lumen (g/lumen) | | | 0.224 |

Figure 7:
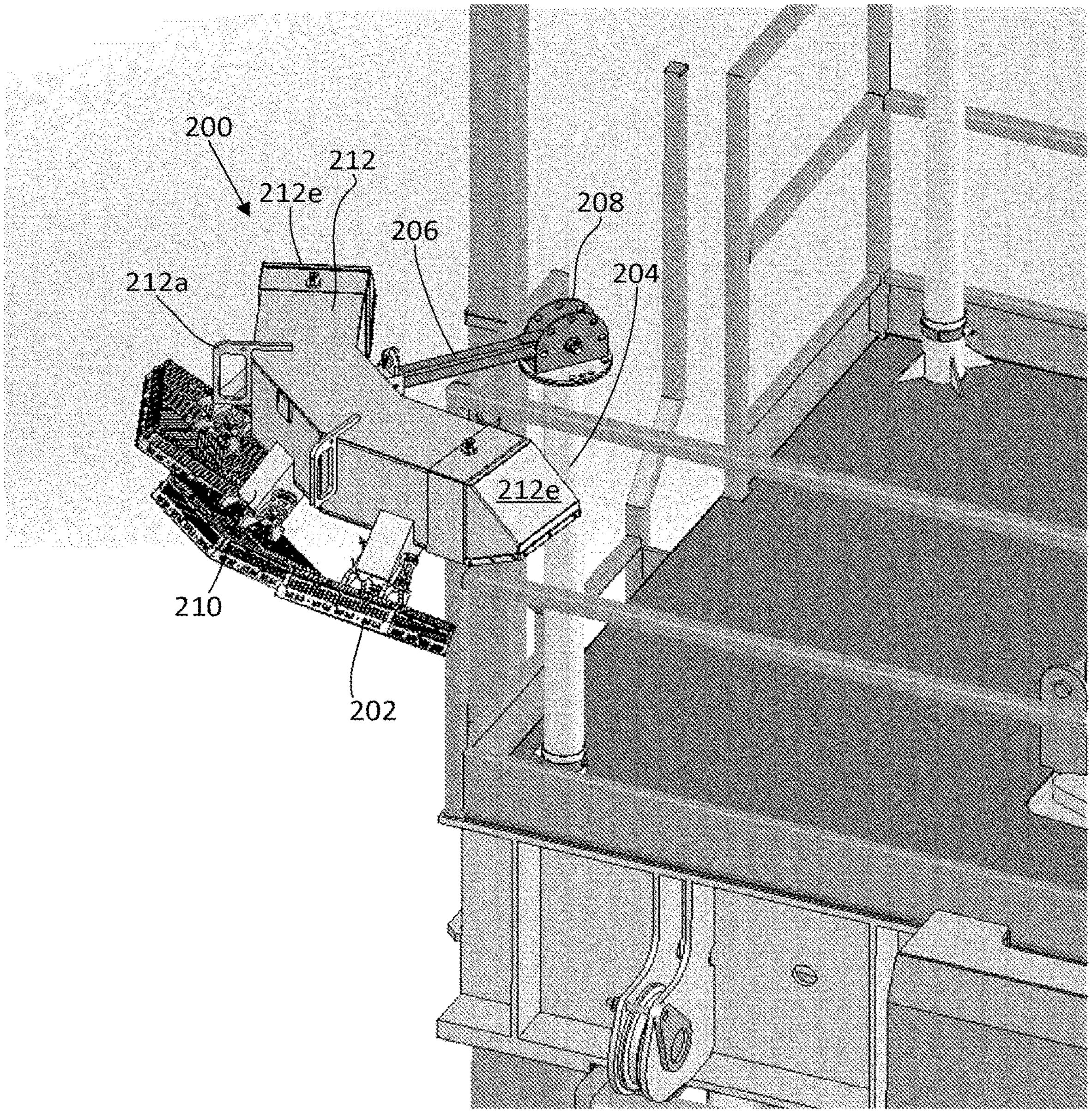
FIG. 7 is a diagram of an integrated light assembly (IA) configured to one corner of a drilling mast in accordance with one embodiment of the invention.
Figure 7A:
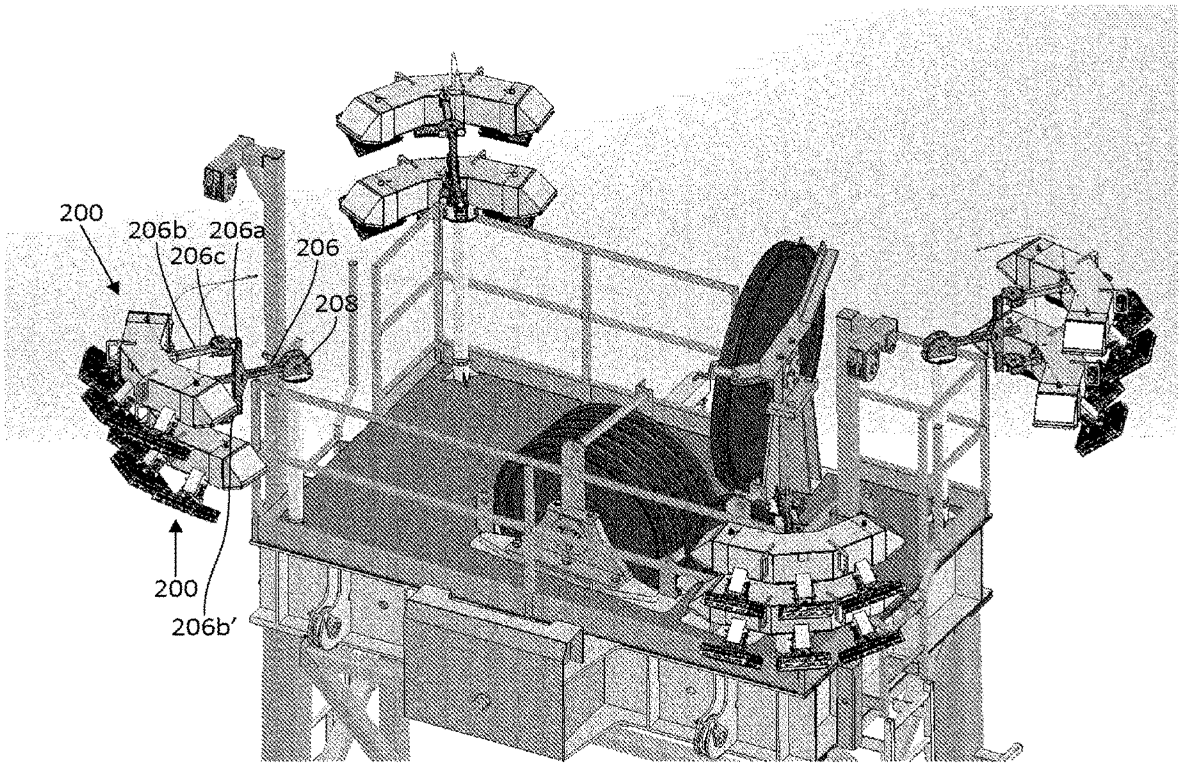
FIG. 7A is a diagram of eight integrated light assemblies (lAs) configured to four corners of a drilling mast in accordance with one embodiment of the invention.

Thus, as shown in FIG. 7A and Table 2, a total of 6 LED lamp assemblies for one corner of a drilling mast may weight approximately 16.3 kgs. Two aluminum AFCs 212 including their electrical assemblies and for mounting a total of 6 LED lamp assemblies may weigh approximately 41.8 kg. A support frame may weigh approximately 9.1 kgs. Accordingly, the entire weight of 6 LED lamp assemblies and the support system would be approximately 67.2 kg and be capable of 300,000 lumens.

Thus, for a drilling mast having 4 LED lighting systems and 1.2 MM lumens as shown in FIG. 7A, the total weight of the LED lighting system would be approximately 268 kg which is significantly lower than current systems weighing upwards of 500 kg for the same light capabilities of approximately 1.2 million lumens (assuming both systems are operated to maintain recommended junction temperatures and utilize similar LEDs). As such, the subject system can dramatically reduce the total mass of an LED lighting system and significantly decrease the added weight/lumen.

Net Weight Reduction

Figure 5:
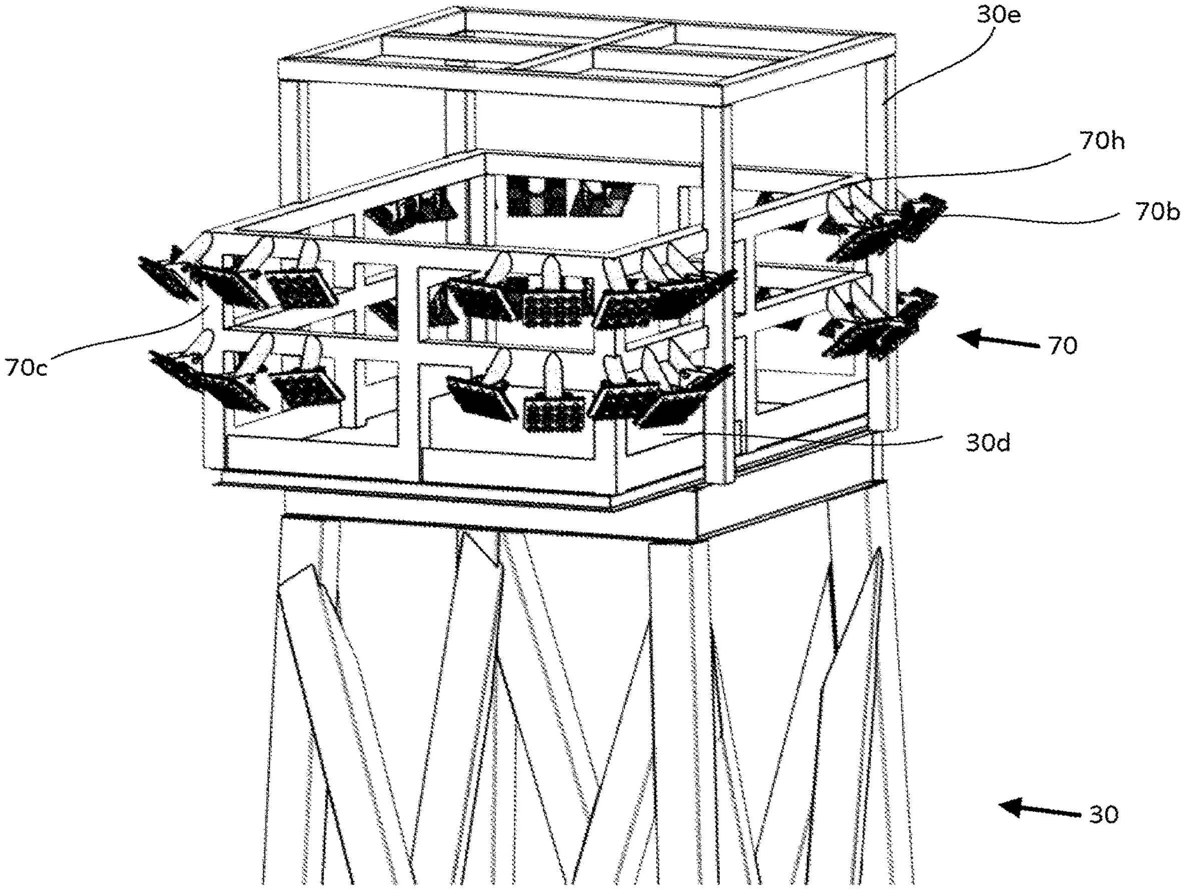
FIG. 5 is a perspective view of an integrated LED lighting and railing system in accordance with one embodiment of the invention.

As shown in FIG. 5, in one embodiment, the LED lighting system is integrated to upper regions of a drilling mast where an existing steel railing system 30*f* is replaced with an LED lighting system where the AFCs of the LED lighting system form the railings of the upper mast thus further reducing the net weight addition of the LED lighting system.

By way of example, and as shown in FIG. 2, a typical mast has a steel handrail assembly that weighs approximately 45-90 kg (100-200 lbs). As shown in FIG. 5, by removing the steel handrail and replacing the steel system with an LED lighting system 70 where the AFC of the LED lighting system provides railing structures, a significant reduction in overall weight can be achieved. In this example, for a square or rectangular mast head, the vertical corner posts and horizontal rails of the steel handrail assembly are replaced with a combination of vertical 70*a* and horizontal 70*h* AFCs that support a plurality of LED lamp assemblies 70*b* supported on conduits 70*c*. The interior channels with the AFCs enable cooling air to be directed to each LED lamp assembly as described above. The AFCs may completely replace existing railings. In some embodiments, non-AFC aluminum railing may be utilized to fill in any gaps as may be required.

As such, by removing 90 kg (200 lbs) of steel handrails and adding a 300kg (650lbs) (representative example weight) integrated lighting and railing system 70 the "net added weight" to the rig is only 210 kg (460 lbs).

In addition, as shown in FIG. 5, a steel cage railing 30*e* may also be replaced with a lighter metal structure such as aluminum, to further reduce the net added weight. Accordingly, in these embodiments, the net added weight/lumen is further reduced as shown in Table 3.

TABLE 3

Representative Net Added Weight/lumen for Integrated LED Lighting and Railing System.

| Parameter | Value |
|---|---|
| Lumens | 1.2 MM/1.5 MM |
| LED Lighting System Weight | 300 kg |
| g/lumen | 0.25 g/lumen@1.2 MM lumen<br>0.2 g/lumen @1.5 MM lumen |
| Steel Railing Removed | −90 kg |
| Net Added Weight/Lumen | 0.175 g/lumen<br>0.14 g/lumen @1.5 MM lumen |

Accordingly, as can be seen from Table 3, substantially lower effective weight/lumen ratios can be achieved by and integrated LED lighting and railings system.

In one embodiment, the integrated lighting and railing system is a single, modular unit that can be configured to the drilling rig mast at site whilst the drilling rig mast is in a horizontal position. The integrated lighting and railing system may be transported independently from the drilling rig mast or connected to it during transportation. If transportable in a connected position, the integrated lighting and railing system may include pivoting arms that can be moved towards a central axis of the mast.

Other features and embodiments of the lighting system are described below.

AFC Design

AFCs are designed to provide a) sufficient heat transfer or air flow capabilities and b) structural strength to mount the desired number of LED lamp assemblies. From a mass and heat conductivity perspective, aluminum will generally provide the best properties for both heat conductivity and reducing weight. Rectangular or square AFCs can be assembled from aluminum panels with additional fin systems mounted to the interior (or exterior) of the conduit. Similarly, for round AFCs, extruded aluminum tubes can be readily assembled to form a branched or straight structure again with a fin system configured to the interior of the conduit. Both systems, rectangular or round or other profiles, will have sufficient void spaces to allow sufficient air flow through each AFC.

Fan System

In those LED lighting systems having a fan, the fan may be operated at one or more fixed speeds or may dynamically adjust air flow through each AFC depending on cooling requirements and as may be determined by a control scheme. In one embodiment, for example, a representative LED lighting system having 12 LED lamp assemblies having 16 LEDs, a fixed air flow of 500 cfm may be effective to continuously circulate air to effect cooling in which case power consumption of each fan system will be in range of 100 Watts.

Lamp Housing

Each LED lamp assembly, of either configuration in FIGS. 2 and 3 or FIG. 4 as the specific case may be, will include a lamp housing supporting LEDs, reflectors and a transparent cover. A housing can be manufactured or assembled from an extruded aluminum profile or flat aluminum panels or a combination thereof.

For example, for the embodiment as shown in FIG. 4 where cooling air is directed against the back of an LED housing, the LED lamp housing may include a relatively low surface area of cooling fins and a hence non-traditional appearance when compared to the surface area of cooling fins of a traditional standalone LED lamp assembly and that would typically be required for a specified lumen output.

For the embodiment as shown in FIG. 3, where heat is conducted through an AFC away from the LED lamp assembly, the back of the LED housing may also have a non-traditional appearance of heat sink fins and have even less surface area when compared to the surface area of cooling fins of a traditional standalone LED lamp assembly.

Mounting Brackets

Each LED lamp assembly or LED lamp housing is attached to an AFC through a mounting bracket, which is preferably adjustable. In the case of the embodiments of FIGS. 2 and 3, the brackets provide effective heat transfer from the LED lamp housing to the AFC. In the case of the embodiment of FIG. 4, the brackets may at least partially assist in directing air over the back of the LED lamp housing. Aluminum brackets and/or strapping can provide effective heat transfer while reducing weight.

Operation

In a typical operating scenario with average ambient conditions, for example lower night temperatures, some air movement, precipitation, and/or cooler seasonal temperatures, the operating temperature of each LED lamp assembly may remain below a recommended operating temperature. However, under various conditions, for example warm summer nights, no wind and/or no precipitation, the operating temperature may rise towards or above a recommended operating temperature. Similarly, the operator may temporarily require more light and increase the power to the LED lighting system.

Generally, the system controller can actively monitor junction temperature and a. reduce power to the LEDs if the temperature rises or increase power to the LEDs as temperature drops or
b. increase or decrease the air flow rate through each AFC as the temperature rises or drops.

In other situations, an operator may selectively choose to increase the light output of the system in which case, the system may allow a temporary increase in power and temperature for a time period and/or increase the air flow rate through the AFC to maintain temperature at the recommended level.

In other situations, the system is designed so that the forced air flow and other design features described herein are fixed and not variable such that there is a contingency of heat dissipation capacity for the environmental changes between summer and winter and wherein the LED lighting system provides a reliable and predictable amount of light on target.

The control system in one embodiment of the present invention incorporates logic that turns the LED lighting system on and off based on the sunrise and sunset time for that location, the controller logic updating itself daily and automatically from satellites thereby minimizing the need for attention by and tasks required by humans.

In another embodiment, the LED lighting system includes a battery or energy storage system configured to the LED lighting system whereby the lights can remain powered in the event of a blackout condition whereby the rig generators may fault and be off-line for a period of time. The backup system may be any one of Lithium batteries, capacitors, generators with control system that auto-starts the generator when needed, or other means of power backup reliability of common means.

Figure 6:
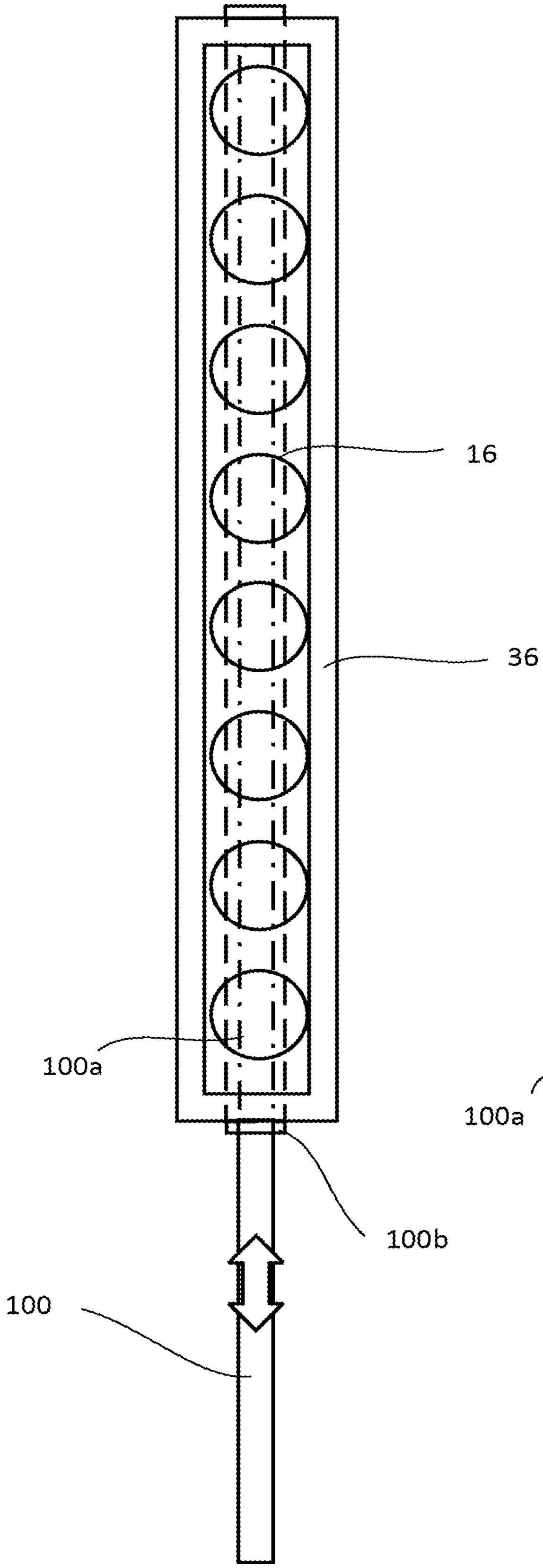
FIGS. 6 and 6A are schematic top (FIG. 6) and cross-sectional (FIG. 6A) views of an LED light panel array having a telescopic arm that functions as a heat sink in accordance with one embodiment of the invention.
Figure 6A:
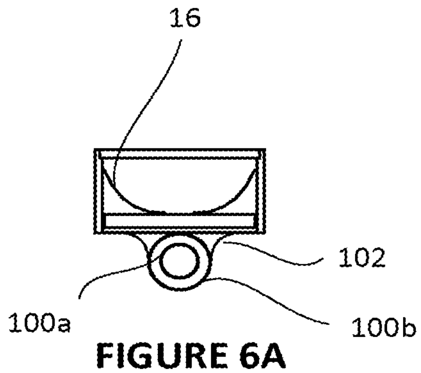

FIGS. 6 and 6A show another embodiment where LEDs are configured to a telescopic pole where heat sink capabilities are provided by the telescopic pole 100. In this case, the telescopic pole includes both an inner pole and an outer pole 100*b* fixed to the housing 36. The inner pole is frictionally engaged with the outer pole allowing the lighting array to be selectively positioned along the inner pole. Importantly, the outer pole 100*b* is in heat transfer contact with the housing 36 through a contact system such as a weld bead 102 allowing heat to transfer through the housing to the outer pole. During operation, and under conditions as described above, the inner pole may also act as a heat sink. These embodiments may be particularly suited for portable construction applications where lighting systems are being regularly moved, positioned and oriented by workers.

Other Embodiments

Figure 7B:
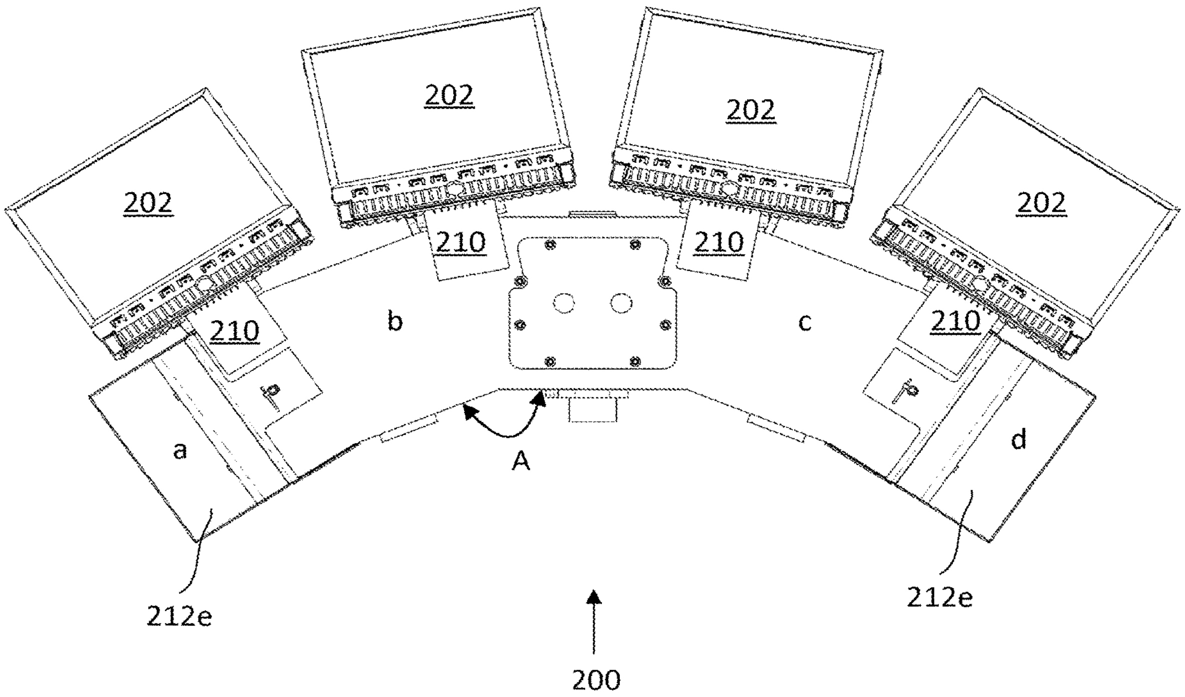
FIG. 7B is a bottom view of an IA in accordance with one embodiment of the invention.
Figure 7C:
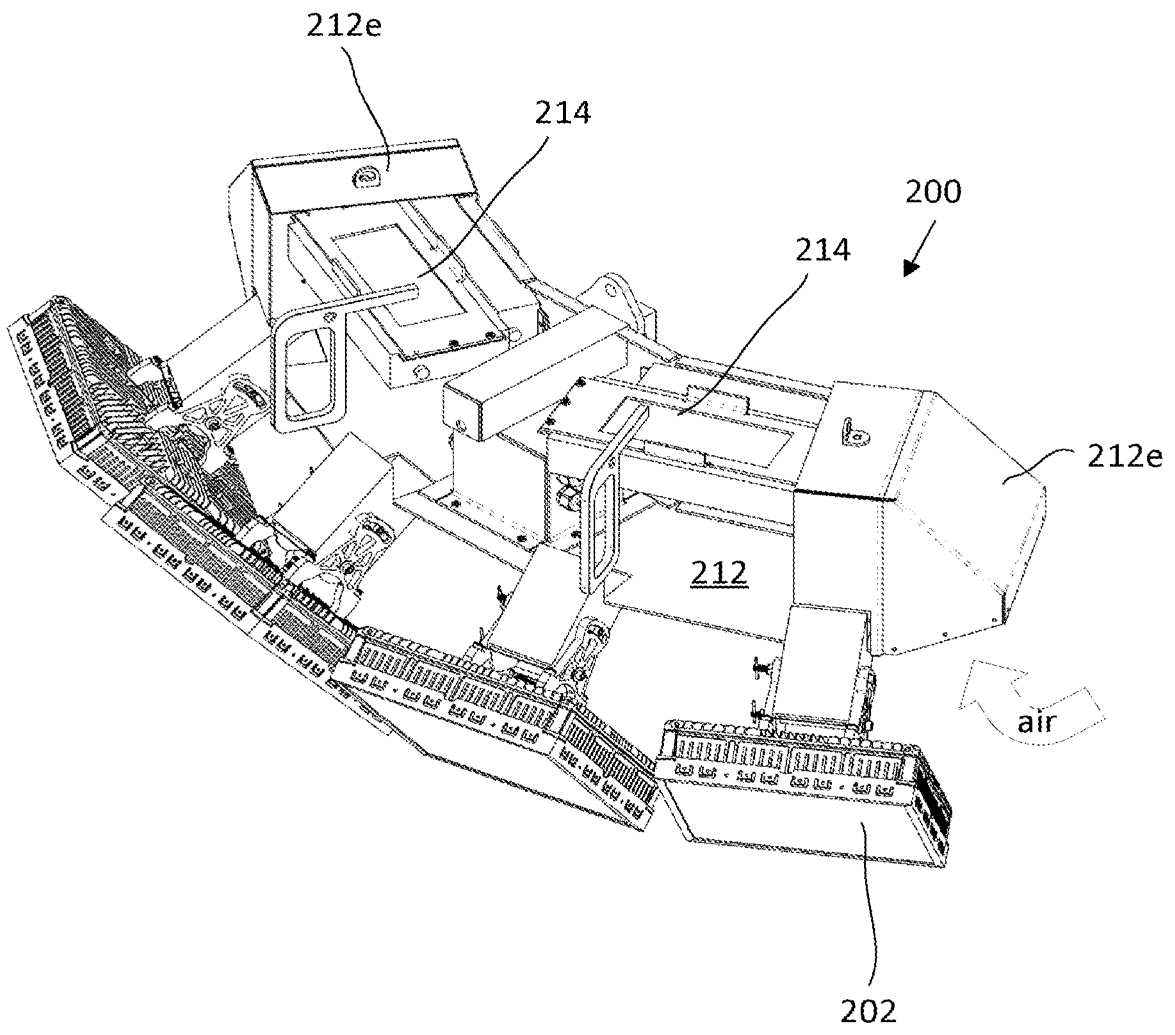
FIG. 7C is an isometric view of an IA with portions of the heat transfer conduit removed in accordance with one embodiment of the invention.
Figure 7D:
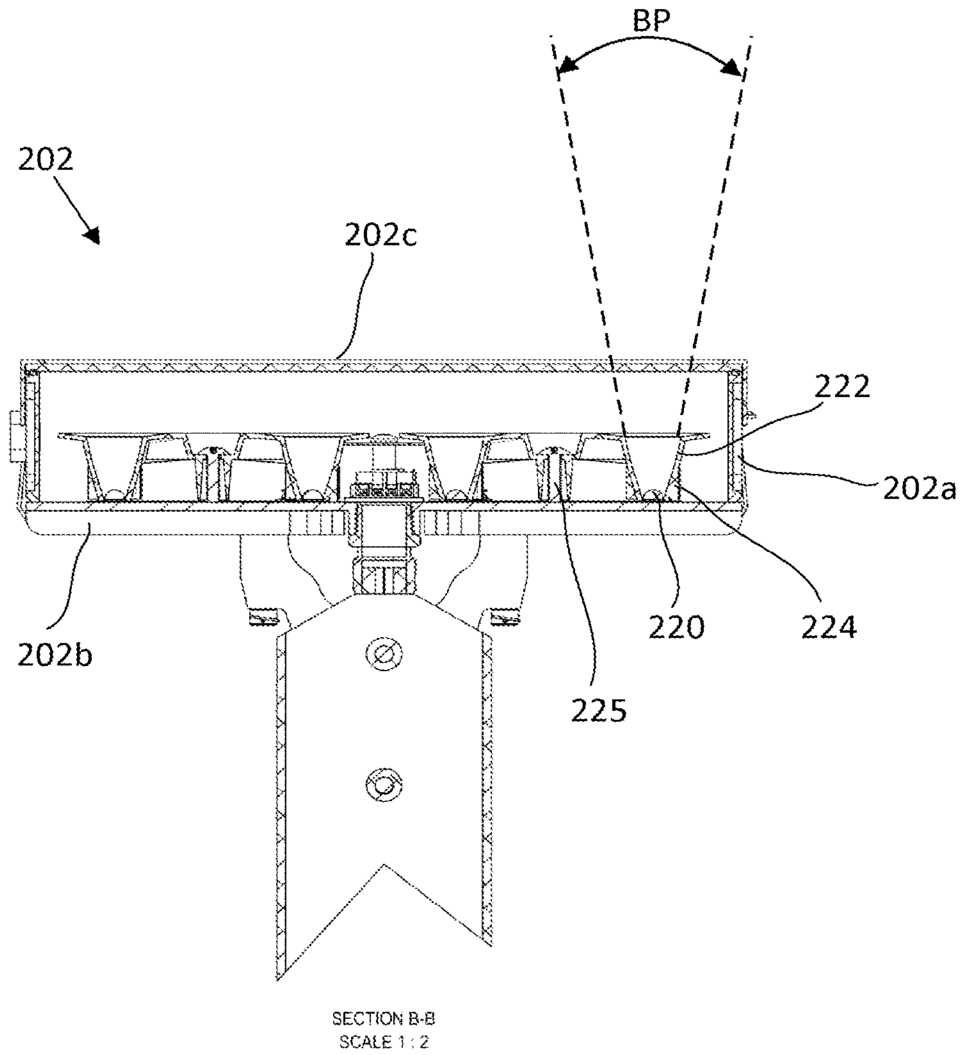
FIG. 7D is a cross-sectional view through a lamp assembly showing a typical beam path from a reflector in accordance with one embodiment of the invention.
Figure 7E:
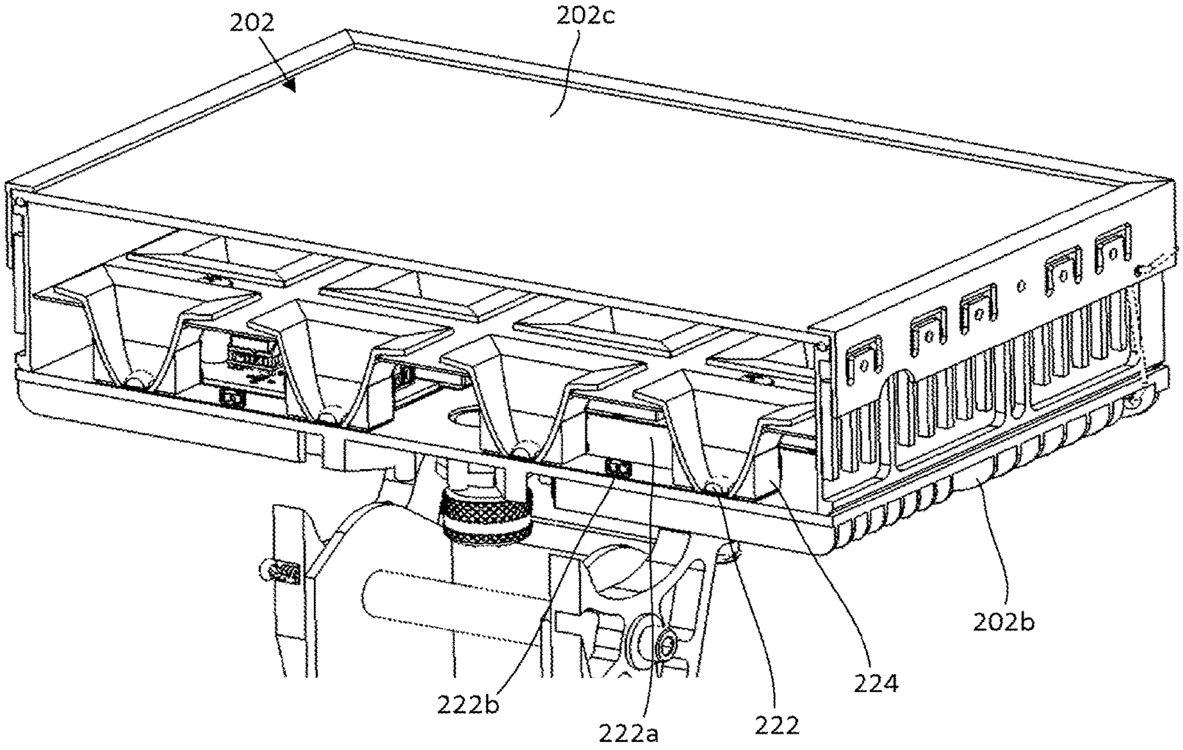
FIG. 7E is a cross-sectional and isometric view of a lamp assembly and reflector heat sinks in accordance with one embodiment of the invention.
Figure 7F:
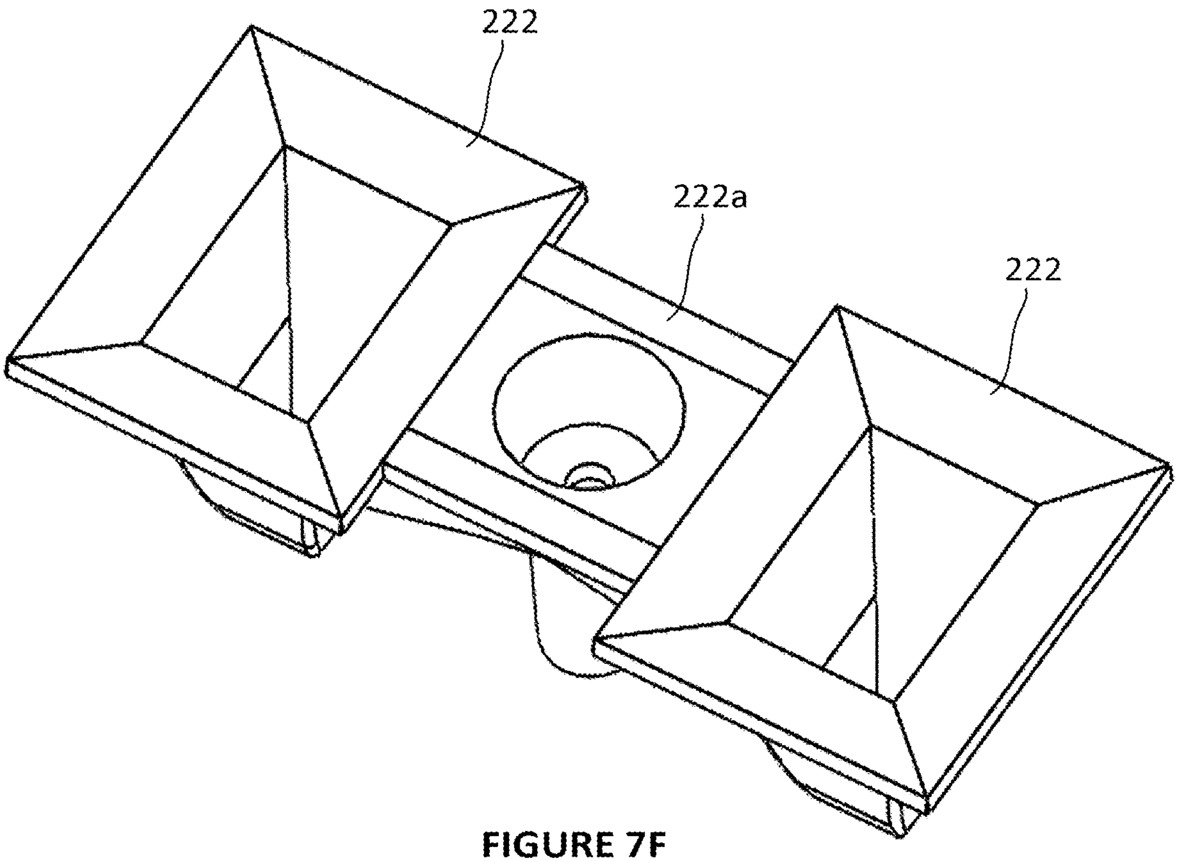
FIGS. 7F-7I are isometric and cross-sectional views of a reflector pair in accordance with one embodiment of the invention.
Figure 7G:
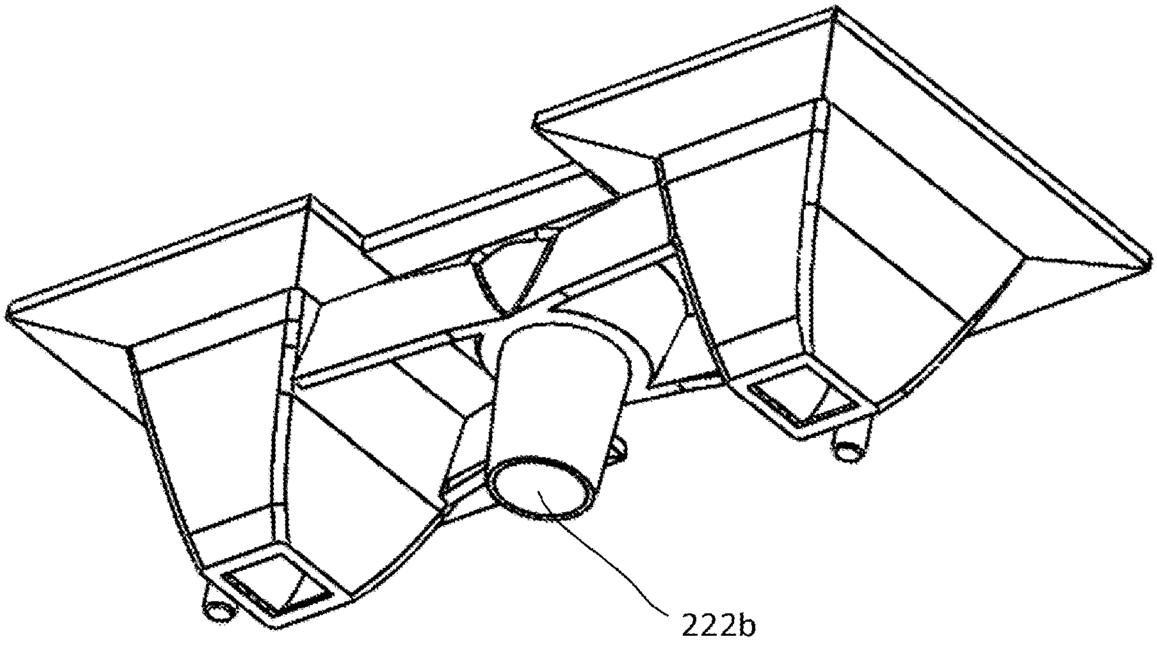
Figure 7H:
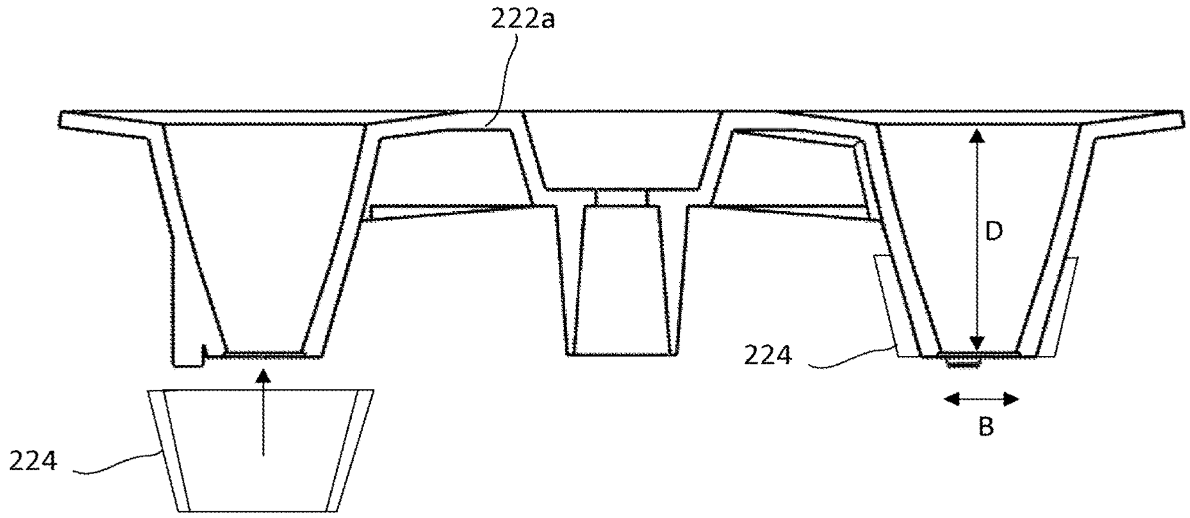
Figure 7I:
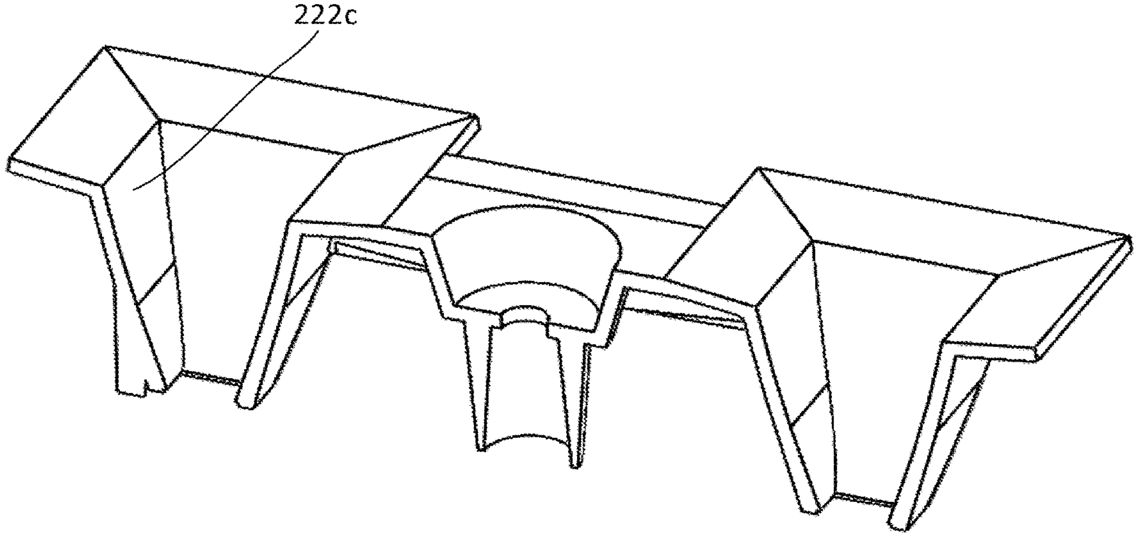
Figure 7J:
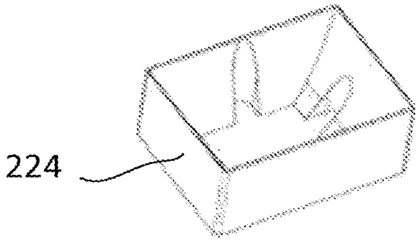
FIG. 7J is an isometric view of an LED reflector heat sink in accordance with one embodiment of the invention.

With reference to FIGS. 7-7F, further embodiments are described having additional features that provide light weight and high output light.

FIG. 7 shows an integrated assembly (IA) 200 having 4 lamp assemblies 202, air flow conduits (AFC) 210 and a main conduit 212. The integrated assembly 200 is configured to the upper deck of a drilling mast via a support pole 204, support arm 206 and hinge connector 208 to position the IA outside the upper deck railing of the drilling mast and allows individual lamp assemblies 202 to project their output light in a generally downward and outward direction.

FIG. 7A shows each corner of a drilling mast supporting two IAs 200 vertically and horizontally separated from one another. In this case, the support system includes additional support members 206*a*, 206*b*, 206*b*' that provide horizontal support for each IA as well as vertical separation. Upper and lower support members 206*b*, 206*b*' may be of different lengths to enable horizontal separation between the two IAs. In addition, connector 206*c* allows pivoting of the support member 206*a* about a vertical axis. Vertical support member 206*a* may also be horizontally positioned on support member 206 to enable horizontal extension or retraction of the IAs relative to the drilling mast. Connector 208 also enables inward pivoting of the entire assembly in order to locate the IAs inside the outer perimeter of the drilling mast which is particularly useful during raising and lowering of the mast and/or during transportation of the drilling mast.

As shown in FIGS. 7, 7A, 7B and 7C, the main conduit 212 is generally a square or rectangular aluminum conduit that supports the lamp assemblies 202 through the AFCs 210. The main conduit may include handles 212*a*. The main conduit 212 shown has sections (a, b, c, d) each supporting one lamp assembly and angled (angle A) with respect to one another as shown in FIG. 7B such that each lamp assembly has a different projection direction.

Each main conduit includes end caps 212*e* at each end of the main conduit that provide an inlet cover duct to the main conduit and weather protection to the drivers and cooling fans (explained below).

Generally, in operation, cooling air is actively drawn in through the end caps 212*e*, through the main conduit and downwardly and against each lamp assembly 202 through AFCs 210.

Referring to FIG. 7C, additional details of an IA are shown and specifically the location of power drivers 214 that control power to one or more lamp assemblies as described below.

Individual lamp assemblies may also be individually adjusted to provide a desired light direction.

Lamp Assembly and LED Reflector Design

As shown in FIGS. 7D-7J, the design of individual lamp assemblies 202, LEDs 220 and reflectors 222 is described for mast applications. For context, in a typical drilling mast application, the lighting system may be mounted at the top of a drilling mast 30-60 m above the ground. As it is desirable to have relatively sharp boundaries between lighted and non-lighted areas at the work location, to create a precise projection/throw from each reflector, the design of the lamp assemblies, LEDs and reflectors includes a number of features that enables a precise light projection/throw. Importantly, this feature also contributes to providing light weight for high light output.

FIG. 7D shows a cross section of a lamp assembly 202. As in other embodiments, the lamp assembly includes a housing 202*a* having cooling fins 202*b* and transparent cover 202*c*. A plurality of LEDs 220 and reflectors 222 (typically 16) are mounted at the base of the housing 202*a*.

As shown in FIG. 7D, each LED 220 is positioned within a reflector such that light emanating from an LED will diverge from the outer edges of the reflector within a relatively tight beam path (BP). The beam path is determined by the depth (D) of the reflector relative to the width (W) of the base and the proximity of the LED to the inner walls of the reflector. Generally, a tighter beam path is enabled by positioning the LED closer to the base of the reflector and by the depth D of the reflector. However, this also causes heat from an operating LED to directly heat the base of the reflector.

As noted, in addition to minimizing the weight, it is also desired to reduce the cost of each reflector; hence, it is desirable that the LED reflectors 222 are plastic such as a metalized polycarbonate. Metalized polycarbonate has a number of optical advantages over metal surfaces as well as manufacturing advantages insomuch that it can be injection molded and hence is relatively inexpensive to produce as compared to cast metal reflectors.

Accordingly, to minimize effects of heat immediately adjacent the LED, the outer surfaces of the base of the reflector are configured with a metallic heat sink 224 (having a conductive thermal mass) (see FIGS. 7H and 7J for example) that is in heat exchange contact with the lower outer walls of the reflector, an LED printed circuit board 230 (FIG. 7K) and indirectly the lamp assembly housing 202*a*. As such, direct heat from the LED can be conveyed away from the reflector as a result of the thermal mass of the heat sink and its surface area contact with the LED printed circuit board 230 and the lamp housing. Importantly, the heat sink can prevent the temperature of a metalized plastic reflector from overheating in that the heat sink enables a more efficient transfer of heat away from the base of the reflector.

In one specific embodiment, the LED 220 has approximate outer dimensions of 7×7 mm, the base of the reflector has an inner dimension of 7.5×7.5 mm and a depth of 26 mm. The top dimensions of the reflector are 20×29 mm with wall angles approximately 30° in the short dimension and 50° in the long dimension. It is to be appreciated that the inner walls 222*c* of the reflector may also be slightly parabolic in shape to further minimize reflection that would diffuse light leaving the reflector.

In one embodiment, the heat sink 224 (FIG. 7J) has lower outer dimensions of approximately 19×25mm and upper outer dimensions of 21×28 mm and a total height of 12 mm. The heat sink 224 is shown schematically in FIG. 7H before (left side) and after assembly (right side) when it is configured to the outer base of a reflector.

Furthermore, and as shown in FIGS. 7F-7I, in order to minimize weight and for convenience of assembly, two or more reflectors 222 are interconnected by a connection member 222*a*. The connection member 222*a* includes a connection bore 222*b* that can be used to seat an assembly screw 225 and thus provides consistent spacing and alignment of reflectors within a lamp assembly and allows connection to the lamp assembly by a single screw or other suitable connector. As understood, arrays of 2 or more reflectors may utilize similar connection members.

Figure 7K:
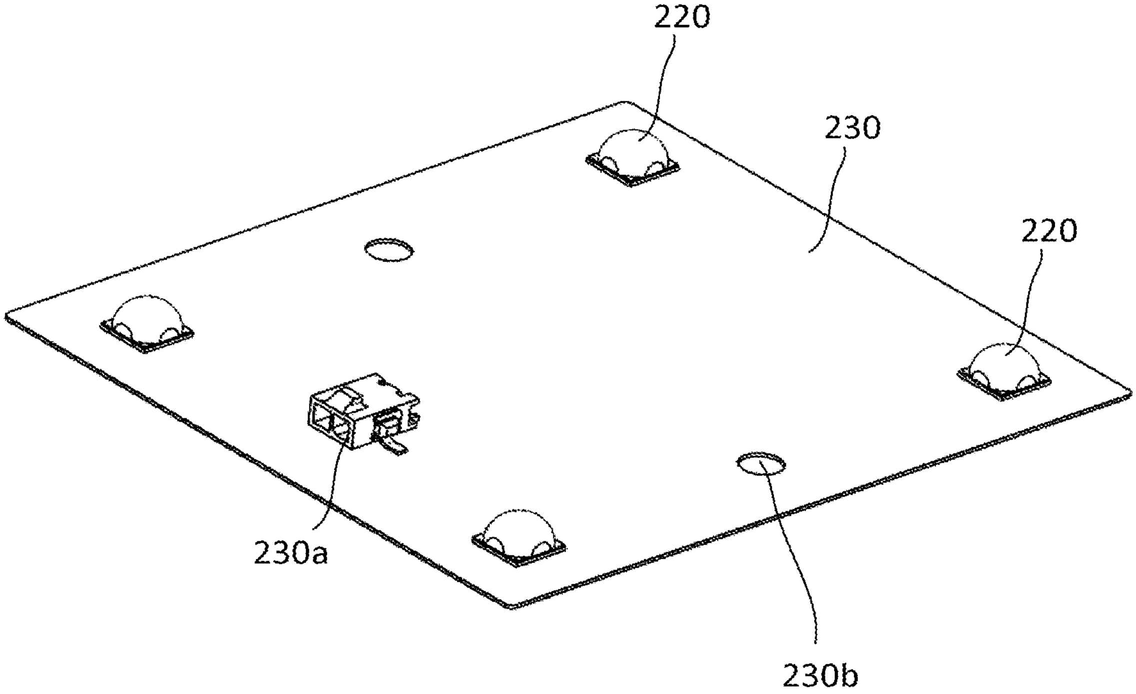
FIG. 7K is an isometric view of a LED printed circuit board in accordance with one embodiment of the invention.

FIG. 7K shows one embodiment of an LED printed circuit board 230 for use within a lamp assembly. In this embodiment, the board 230 is aluminum with 4 LEDs 220. The board includes internal power conducting traces (not shown) and is suitably insulated from the main board. The board includes a power connector 230*a* for interconnecting an array of LEDs and reflectors on separate LED printed circuit boards as well as connection holes 230*b* for aligning with the screw connector described above which in turn align two LEDs within the base of a reflector pair as shown in FIGS. 7F-7I.

Suitable heat conductive pastes may be utilized between mating surfaces to enhance heat transfer from surfaces exposed to LED heat.

Power and Control System

The control system is designed to efficiently provide power to a number of IAs, provide effective temperature monitoring and power control to minimize the risk of overheating and hence damage to the light system while also minimizing the weight of the cabling required to power a number of IAs that may be configured to a drilling mast.

Figure 8:
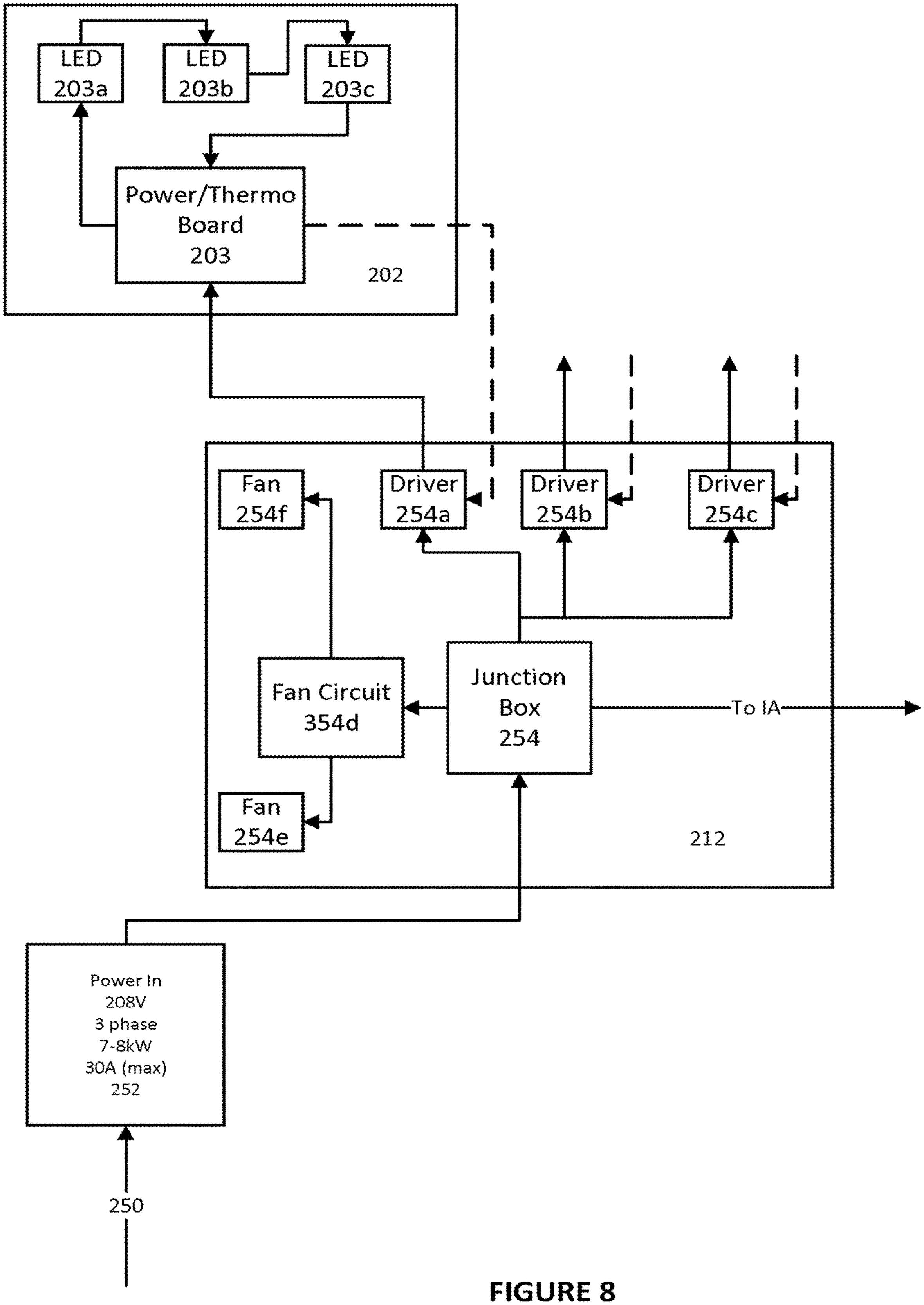
FIG. 8 is a schematic diagram of a control system in accordance with one embodiment of the invention.

A control system is shown in FIG. 8. Power is routed up the mast via a connecting cable 250 to a control box 252. The control box includes cable connectors for connecting the power cable to the top-of-mast power and control system. The control box may include other functionality including for example GPS location and/or Bluetooth communication systems for reporting information such as location and/or system parameters to rig/service operators. In one embodiment, power is delivered at ~208V, 3 phase, 30A (max) and power rating of 7-8 kW.

As noted above, the drilling mast may be configured with up to 8 IAs (although this may be greater with some embodiments). Each IA will generally be daisy-chained together to minimize the length (and hence weight) of power cables at the top of the mast. As shown in FIG. 8, the control box is connected to a first junction box 254 within an IA 212. The junction box 254 directs power within the IA to one or more lamp assembly drivers 254*a*, 254*b* and 254*c*.

In addition, power is directed to a fan circuit 254*d*, which in turn delivers power to one or more fans 254*e*, 254*f*. The fan circuit is provided with a thermosensitive switch to deactivate the fan circuit if the ambient air temperature is below a threshold such as below −5C. If the temperature is above the threshold, the fans will be activated.

Each driver 254*a*, 254*b*, 254*c* is connected to a lamp assembly 202 via power cable 254*g* to a power/thermo board 203. The power/thermo board delivers power to each LED assembly 203*a*, 203*b*, 203*c* within the lamp assembly. As described above, each LED assembly may include one or more LEDs 220 operatively connected to a printed circuit board 230 and each LED assembly may be daisy-chained together.

The power/thermo board 203 monitors temperature within the lamp assembly and includes logic to monitor and report threshold temperatures to a specific lamp assembly driver. If the power/thermo board determines the temperature is rising (for example through a temperature range of 67-77° C.), the drivers 203*a*, 203*b*, 203*c* will progressively and individually reduce the current to each lamp assembly to limit the temperature rise of a lamp assembly using an open loop control within the control unit. Thus, as each lamp assembly has its own power/thermo board and driver, each lamp assembly is independently controlled in terms of maintaining an operating temperature within a desired range.

Each junction box 254 may be connected to adjacent IAs, either on the same corner or another location of a drilling mast in a daisy-chain manner and ultimately back to the control box.

Light Projection

Figure 9:
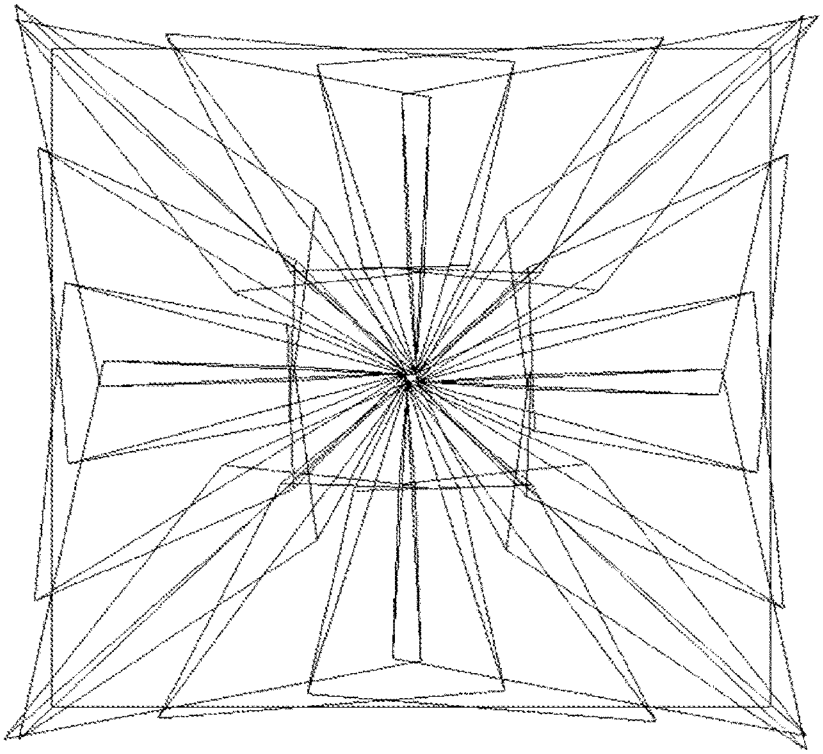
FIGS. 9 and 9A are sketches of the light projection pattern of a lighting system in accordance with one embodiment of the invention.
Figure 9A:
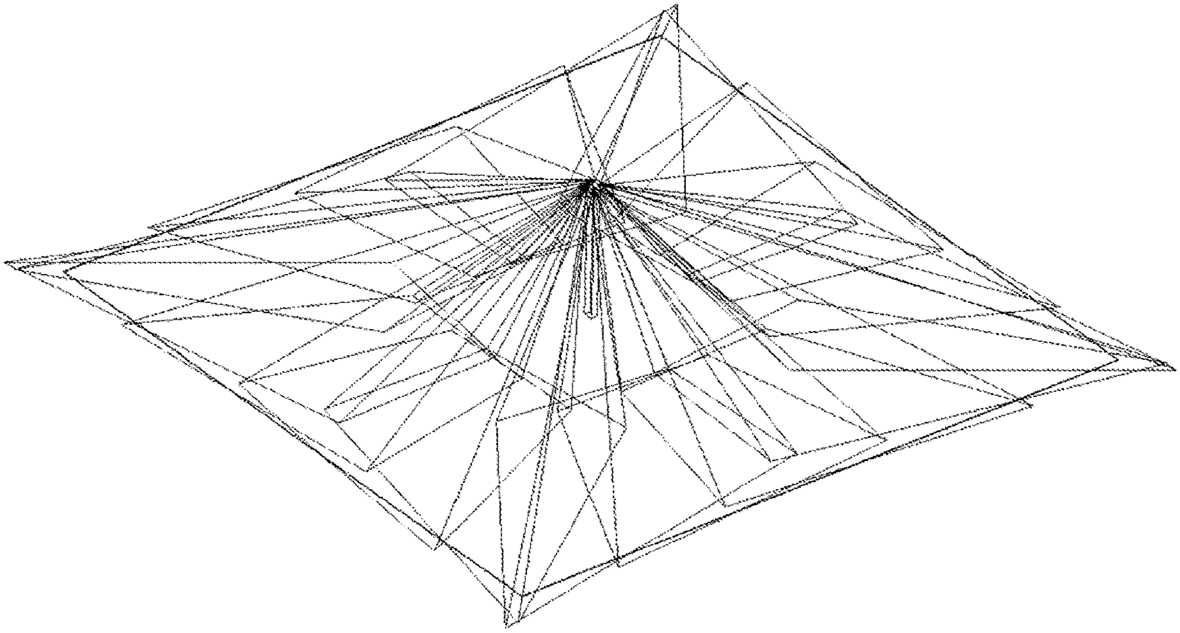

As shown in FIGS. 9 and 9A, light from a plurality of IAs each having a number of lamp assemblies will downwardly and outwardly project light to the surface and intersecting the surface as a series of generally trapezoidal-shaped light patterns. As shown in FIG. 9, the light pattern of each lamp assembly will preferably be directed so as to overlap with one or more adjacent lamp assemblies so as to fully illuminate a desired area.

Importantly, the outer edges of the light projection will be reasonably sharp so as to minimize light pollution outside the desired area but also to minimize light in an area immediately adjacent the mast which may be a working area and where it may be desired to prevent extremely bright lights from "blinding" workers in a specific working area.

Transportation

In other embodiments, where the crown or upper regions of a mast are retrofit to receive a LED lighting system that is a stand alone add-on, or partially or fully replaces components such as a railing, the LED lighting system may no longer project laterally or more specifically downward from the mast when the mast is laid in its horizontal position for transport and/or may be withdrawn towards the central axis of the mast. In this case, the LED lighting system may be permanently (or semi-permanently) retained on the mast thereby reducing or obviating the need for manpower and equipment to install/uninstall the LED lighting system prior to and after transportation.

Although the present invention has been described and illustrated with respect to preferred embodiments and preferred uses thereof, it is not to be so limited since modifications and changes can be made therein which are within the full, intended scope of the invention as understood by those skilled in the art.

What is claimed is:

1. An LED lighting system for configuration to a supporting structure, the LED lighting system comprising:

a plurality of LED lamps and reflectors within each LED lamp assembly of a plurality of LED lamp assemblies, an air flow system having at least one air flow conduit (AFC) for directing air flow against each LED lamp assembly to effect cooling of the LED lamps and to provide structural support to each LED lamp assembly for connection to the supporting structure;

wherein the LED lighting system has a weight/lumen ratio of less than 0.55 g/lumen, wherein the AFC includes a horizontally oriented conduit having an air entry and an air exit, wherein the horizontally oriented conduit operatively and structurally supports at least one lamp assembly housing, and wherein the horizontal conduit includes a plurality of sections, each section of the plurality of sections is configured to support an LED lamp assembly, and each section is angled with respect to an other section of the plurality of sections such that each LED lamp assembly has a different projection direction.

2. The LED lighting system as in claim 1 wherein the LED lighting system provides greater than 500,000 lumens.

3. The LED lighting system as in claim 1 wherein each LED lamp assembly includes a lamp assembly housing having a plurality of surfaces for effecting heat transfer of heat from the LED lamps away from the LED lamps.

4. The LED lighting system as in claim 1 wherein each AFC is operatively connected to a lamp assembly housing, the AFC having an air channel for moving cooling air through the AFC and for conveying heat from each LED lamp assembly away from each LED lamp assembly to effect cooling of each LED lamp assembly and to maintain an operating temperature of the LED lamp assembly at or below a threshold temperature during use.

5. The LED lighting system as in claim 1 wherein the mass/lumen ratio is realized by a balance of a collective weight and thermal mass of each LED lamp assembly and AFC to provide sufficient structural strength to support the LED lighting system and an adequate thermal mass of each LED lamp assembly housing to effect sufficient cooling when each lamp assembly is operating at ambient temperature and air flow is flowing over each LED lamp assembly.

6. The LED lighting system as in claim 1 further comprising a fan system operatively connected to the AFC for actively moving air through the AFC.

7. The LED lighting system as in claim 1 wherein the AFC includes a vertically oriented conduit having a lower air entry and upper air exit and wherein cool air enters the lower air entry and warm heated air exits the upper air exit.

8. The LED lighting system as in claim 1 further comprising a controller for managing LED lamp assembly temperature, wherein the controller monitors the temperature within an LED lamp assembly and adjusts air flow speed to increase or decrease air flow through the AFC to maintain LED lamp assembly temperature below a predetermined threshold temperature.

9. The LED lighting system as in claim 1 further comprising a duct collar operatively connected to a lamp assembly for directing cooling air against a lamp assembly housing at substantially 90 degrees to the lamp assembly.

10. The LED lighting system as in claim 1 wherein each lamp assembly housing has one or more outer edges and includes cooling fins extending radially from a central position on a lamp assembly housing towards each outer edge of the lamp assembly housing for providing an even air flow across the lamp assembly housing.

11. The LED lighting system as in claim 1, wherein the LED lighting system has a weight/lumen ratio of less than 0.35 g/lumen.

12. The LED lighting system as in claim 1, wherein the LED lighting system has a weight/lumen ratio of less than 0.25 g/lumen.

13. The LED lighting system as in claim 1, wherein at least one end section of the plurality of sections includes an end cap configured to extend from the at least one end section of the plurality of sections to provide cover and weather protection.

14. A control system for an LED light system having a plurality of LED lamp assemblies, each LED lamp assembly having a plurality of LED lamps operatively contained within an LED housing, an air flow conduit (AFC) operatively configured with a fan system to deliver cooling air to each LED lamp assembly, the control system for controlling power to the LED lamps and to maintain an operating temperature within a desired range, the control system comprising:

a power driver operatively connected to a power supply and to the LED lamps of an LED lamp assembly;

a temperature sensor and controller operatively connected to each LED housing for monitoring the temperature of the LED housing, the temperature sensor and controller for reporting the temperature of the LED housing to the power driver;

wherein the power driver increases or decreases power to the LED lamps in response to the temperature of the LED housing and wherein if the temperature of the LED housing is above a threshold, power is reduced to the LED lamps, and wherein if the temperature is below a threshold, power is increased to the LED lamps up to a pre-determined power threshold, wherein the AFC operatively configured with a fan system to deliver cooling air to each LED lamp assembly includes a horizontal oriented conduit having an air entry and an air exit, and the horizontally oriented conduit operatively and structurally supports at least one LED housing, and wherein the horizontal conduit includes a plurality of sections, each section of the plurality of sections is configured to support an LED lamp assembly of the plurality of LED lamp assemblies, and each section is angled with respect to an other section of the plurality of sections such that each LED lamp assembly has a different projection direction.

15. The control system as in claim 14 further comprising a fan driver operatively connected to the power supply and wherein the fan driver activates the fan above a temperature threshold and deactivates the fan below a temperature threshold.

16. An LED lighting system for configuration to a supporting structure, the LED lighting system comprising:

a plurality of LED lamps and reflectors within each LED lamp assembly of a plurality of LED lamp assemblies, an air flow system having at least one air flow conduit (AFC) for directing air flow against each LED lamp assembly to effect cooling of the LED lamps and to provide structural support to each LED lamp assembly for connection to the supporting structure;

wherein the LED lighting system has a weight/lumen ratio of less than 0.55 g/lumen, wherein the AFC includes a vertically oriented conduit having a lower air entry and upper air exit, wherein cool air enters the lower air entry and warm heated air exits the upper air exit, wherein the vertically oriented conduit includes at least one substantially horizontal branch conduit extending laterally from the vertically oriented conduit, and wherein each horizontal branch conduit operatively and structurally supports at least one lamp assembly housing, and wherein the horizontal branch conduits each includes a plurality of sections, each section of the plurality of sections is configured to support an LED lamp assembly of the plurality of LED lamp assemblies, and each section is angled with respect to an other section of the plurality of sections such that each LED lamp assembly has a different projection direction.

17. The LED lighting system as in claim 16 further comprising a fan system operatively connected to the lower air entry of the vertical conduit for actively moving air through the AFC.

18. The LED lighting system as in claim 16 wherein the LED lighting system provides greater than 500,000 lumens.

* * * * *